(12) United States Patent
Inoue et al.

(10) Patent No.: US 9,469,372 B2
(45) Date of Patent: Oct. 18, 2016

(54) BICYCLE PEDAL

(71) Applicant: SHIMANO INC., Sakai (JP)

(72) Inventors: Akira Inoue, Sakai (JP); Takuro Yamane, Sakai (JP)

(73) Assignee: SHIMANO INC., Sakai (JP)

( * ) Notice: Subject to any disclaimer, the term of this patent is extended or adjusted under 35 U.S.C. 154(b) by 51 days.

(21) Appl. No.: 14/505,447

(22) Filed: Oct. 2, 2014

(65) Prior Publication Data

US 2016/0096586 A1  Apr. 7, 2016

(51) Int. Cl.
*B62M 3/08* (2006.01)

(52) U.S. Cl.
CPC ..................... *B62M 3/086* (2013.01)

(58) Field of Classification Search
CPC ... B62M 3/08; B62M 3/086; Y10T 74/2168; Y10T 74/217
See application file for complete search history.

(56) References Cited

U.S. PATENT DOCUMENTS

| | | | | |
|---|---|---|---|---|
| 5,115,692 A | * | 5/1992 | Nagano | B62M 3/086 280/11.31 |
| 9,021,918 B2 | * | 5/2015 | Inoue | B62M 3/086 74/594.6 |
| 9,290,234 B2 | * | 3/2016 | Inoue | B62M 3/086 |
| 2014/0116200 A1 | | 5/2014 | Inoue | |

\* cited by examiner

*Primary Examiner* — Thomas Diaz
(74) *Attorney, Agent, or Firm* — Mori & Ward, LLP

(57) ABSTRACT

A bicycle pedal comprises a pedal axle, a pedal body, a first sub member, a first clamping member, a second clamping member, and a biasing structure. The first sub member is movable relative to the pedal body about a first pivot axis in a first pivot direction and a second pivot direction opposite to the first pivot direction. The first clamping member is movable relative to the first sub member about a second pivot axis substantially parallel to the first pivot axis in a third pivot direction and a fourth pivot direction opposite to the third pivot direction. The first pivot axis is closer to a point on the pedal axle than the second pivot axis when viewed from an axial direction parallel to the first pivot axis.

22 Claims, 27 Drawing Sheets

FIG. 27

BICYCLE PEDAL

BACKGROUND OF THE INVENTION

1. Field of the Invention

The present invention relates to a bicycle pedal.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle pedal such as a clipless pedal.

SUMMARY OF THE INVENTION

In accordance with a first aspect of the present invention, a bicycle pedal comprises a pedal axle, a pedal body, a first sub member, a first clamping member, a second clamping member, and a biasing structure. The pedal body is rotatably supported on the pedal axle about a rotational axis. The first sub member is movably coupled to the pedal body. The first sub member is movable relative to the pedal body about a first pivot axis in a first pivot direction and a second pivot direction opposite to the first pivot direction. The first clamping member is movably coupled to the first sub member. The first clamping member is movable relative to the first sub member about a second pivot axis substantially parallel to the first pivot axis in a third pivot direction and a fourth pivot direction opposite to the third pivot direction. The second clamping member is coupled to the pedal body to clamp a cleat together with the first clamping member. The biasing structure is configured to bias the first clamping member in the fourth pivot direction and the first sub member in the second pivot direction. The first pivot axis is closer to a point on the pedal axle than the second pivot axis when viewed from an axial direction parallel to the first pivot axis.

In accordance with a second aspect of the present invention, the bicycle pedal according to the first aspect is configured so that the first pivot axis is substantially parallel to the rotational axis. The first pivot axis is closer to the pedal axle than the second pivot axis when viewed from the axial direction parallel to the first pivot axis.

In accordance with a third aspect of the present invention, the bicycle pedal according to the first aspect is configured so that the first clamping member includes a first cleat engagement portion configured to engage the cleat in a state where the first clamping member and the second clamping member clamp the cleat. The second pivot axis is closer to the first cleat engagement portion than the first pivot axis when viewed from the axial direction parallel to the rotational axis.

In accordance with a fourth aspect of the present invention, the bicycle pedal according to the first aspect is configured so that the first sub member is movable relative to the pedal body about the first pivot axis between a first position and a second position. The first clamping member is movable relative to the first sub member about a second pivot axis between a third position and a fourth position. The first sub member, the first pivot axis, the first clamping member, the second pivot axis and the biasing structure are configured such that a first torque to pivot the first sub member about the first pivot axis toward the second position is less than a second torque to pivot the first clamping member about the second pivot axis toward the fourth position.

In accordance with a fifth aspect of the present invention, the bicycle pedal according to the first aspect is configured so that the first sub member, the first pivot axis, the first clamping member, the second pivot axis and the biasing structure are configured such that the first sub member is moved relative to the pedal body about the first pivot axis in the first pivot direction in a state where a first force to move the first clamping member in the first direction is applied to the first clamping member. The first sub member, the first pivot axis, the first clamping member, the second pivot axis and the biasing structure are configured such that the first sub member stays or is moved relative to the pedal body about the first pivot axis in the second pivot direction in a state where a second force to move the first clamping member in the third direction is applied to the first clamping member, the first force directing in a direction different from a direction of the second force.

In accordance with a sixth aspect of the present invention, the bicycle pedal according to the fifth aspect is configured so that the first force is applied from the cleat to the first clamping member in a step-in operation of the bicycle pedal. The second force is applied from the cleat to the first clamping member in a step-out operation of the bicycle pedal.

In accordance with a seventh aspect of the present invention, the bicycle pedal according to the sixth aspect is configured so that the first force directs in a first force direction to provide a first force angle between the first force direction and a cleat attachment plane defined by the first clamping member and the second clamping member. The second force directs in a second force direction to provide a second force angle between the second force direction and the cleat attachment plane. The first force angle is larger than the second force angle.

In accordance with an eighth aspect of the present invention, the bicycle pedal according to the third aspect is configured so that the biasing structure includes a first biasing member and a second biasing member. The first biasing member is configured to bias the first clamping member relative to the pedal body in the fourth pivot direction. The second biasing member is configured to bias the first clamping member relative to the first sub member in the fourth pivot direction.

In accordance with a ninth aspect of the present invention, the bicycle pedal according to the eighth aspect is configured so that the first biasing member includes a first end and a second end. The first end is configured to engage with the pedal body. The second end is configured to engage with the first clamping member. The second biasing member includes a third end and a fourth end. The third end is configured to engage with the first sub member. The fourth end is configured to engage with the first clamping member.

In accordance with a tenth aspect of the present invention, the bicycle pedal according to the ninth aspect is configured so that the second biasing member is configured to apply a biasing force to the first sub member at a third point defined between the third end and the first sub member. The second biasing member is configured to apply a biasing force to the first clamping member at a fourth point defined between the fourth end and the first clamping member. A distance between the first pivot axis and the third point is shorter than a distance between the first pivot axis and the fourth point.

In accordance with an eleventh aspect of the present invention, the bicycle pedal according to the eighth aspect is configured so that the biasing structure includes a biasing support configured to support the second biasing member to be pivotable relative to the first sub member about a biasing pivot axis.

In accordance with a twelfth aspect of the present invention, the bicycle pedal according to the eleventh aspect is configured so that the biasing pivot axis is substantially coaxial with the first pivot axis.

In accordance with a thirteenth aspect of the present invention, the bicycle pedal according to the eleventh aspect is configured so that the biasing support includes a movable part and a pivot part. The movable part is spaced apart from the biasing pivot axis. The pivot part is configured to pivotably support the movable part relative to the pedal body about the biasing pivot axis. The second biasing member is mounted to the movable part.

In accordance with a fourteenth aspect of the present invention, the bicycle pedal according to the thirteenth aspect is configured so that the movable part is provided between the pedal axle and the second pivot axis when viewed from the axial direction parallel to the rotational axis.

In accordance with a fifteenth aspect of the present invention, the bicycle pedal according to the thirteenth aspect is configured so that the movable part is closer to the first cleat engagement portion than the first pivot axis when viewed from the axial direction parallel to the rotational axis.

In accordance with a sixteenth aspect of the present invention, the bicycle pedal according to the thirteenth aspect is configured so that the third end of the second biasing member includes a contact part configured to contact the first sub member. The contact part is closer to the first cleat engagement portion than the first pivot axis when viewed from the axial direction parallel to the rotational axis.

In accordance with a seventeenth aspect of the present invention, the bicycle pedal according to the thirteenth aspect is configured so that the pivot part is configured to be pivotably connected to the pedal body.

In accordance with an eighteenth aspect of the present invention, the bicycle pedal according to the thirteenth aspect is configured so that the biasing pivot axis is closer to the first cleat engagement portion than the second pivot axis when viewed from the axial direction parallel to the rotational axis.

In accordance with a nineteenth aspect of the present invention, the bicycle pedal according to the thirteenth aspect is configured so that when viewed from the axial direction parallel to the rotational axis, the second pivot axis is disposed within an outline of the second biasing member in a state where the first clamping member is disposed at a rest position where the first clamping member is free from a force from the cleat.

In accordance with a twentieth aspect of the present invention, the bicycle pedal according to the eighteenth aspect is configured so that the third end of the second biasing member includes a contact part configured to contact the first sub member. The contact part is closer to the first cleat engagement portion than the first pivot axis when viewed from the axial direction parallel to the rotational axis.

In accordance with a twenty-first aspect of the present invention, the bicycle pedal according to the first aspect is configured so that the pedal body includes a restricting portion configured to restrict the first sub member from moving relative to the pedal body in the second pivot direction.

In accordance with a twenty-second aspect of the present invention, a bicycle pedal comprises a pedal axle, a pedal body, a first sub member, a first clamping member, a second clamping member, and a biasing structure. The pedal body is rotatably supported on the pedal axle about a rotational axis. The first sub member is movably coupled to the pedal body. The first sub member is movable relative to the pedal body about a first pivot axis in a first pivot direction and a second pivot direction opposite to the first pivot direction. The first clamping member is movably coupled to the first sub member. The first clamping member is movable relative to the first sub member about a second pivot axis substantially parallel to the first pivot axis in the third pivot direction and the fourth pivot direction. The second clamping member is coupled to the pedal body to clamp a cleat together with the first clamping member. The biasing structure is configured to bias the first clamping member in the fourth pivot direction and the first sub member in the second pivot direction. The first sub member, the first pivot axis, the first clamping member, the second pivot axis and the biasing structure are configured such that the first sub member is moved relative to the pedal body about the first pivot axis in the first pivot direction in a state where a first force to move the first clamping member in the first pivot direction is applied to the first clamping member. The first sub member, the first pivot axis, the first clamping member, the second pivot axis and the biasing structure are configured such that the first sub member stays or is moved relative to the pedal body about the first pivot axis in the second pivot direction in a state where a second force to move the first clamping member in the third pivot direction is applied to the first clamping member, the first force directing in a direction different from a direction of the second force.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 27 is a partial side elevational view of a biasing structure of the bicycle pedal illustrated in FIG. 23.

DESCRIPTION OF THE EMBODIMENTS

Figure 1:
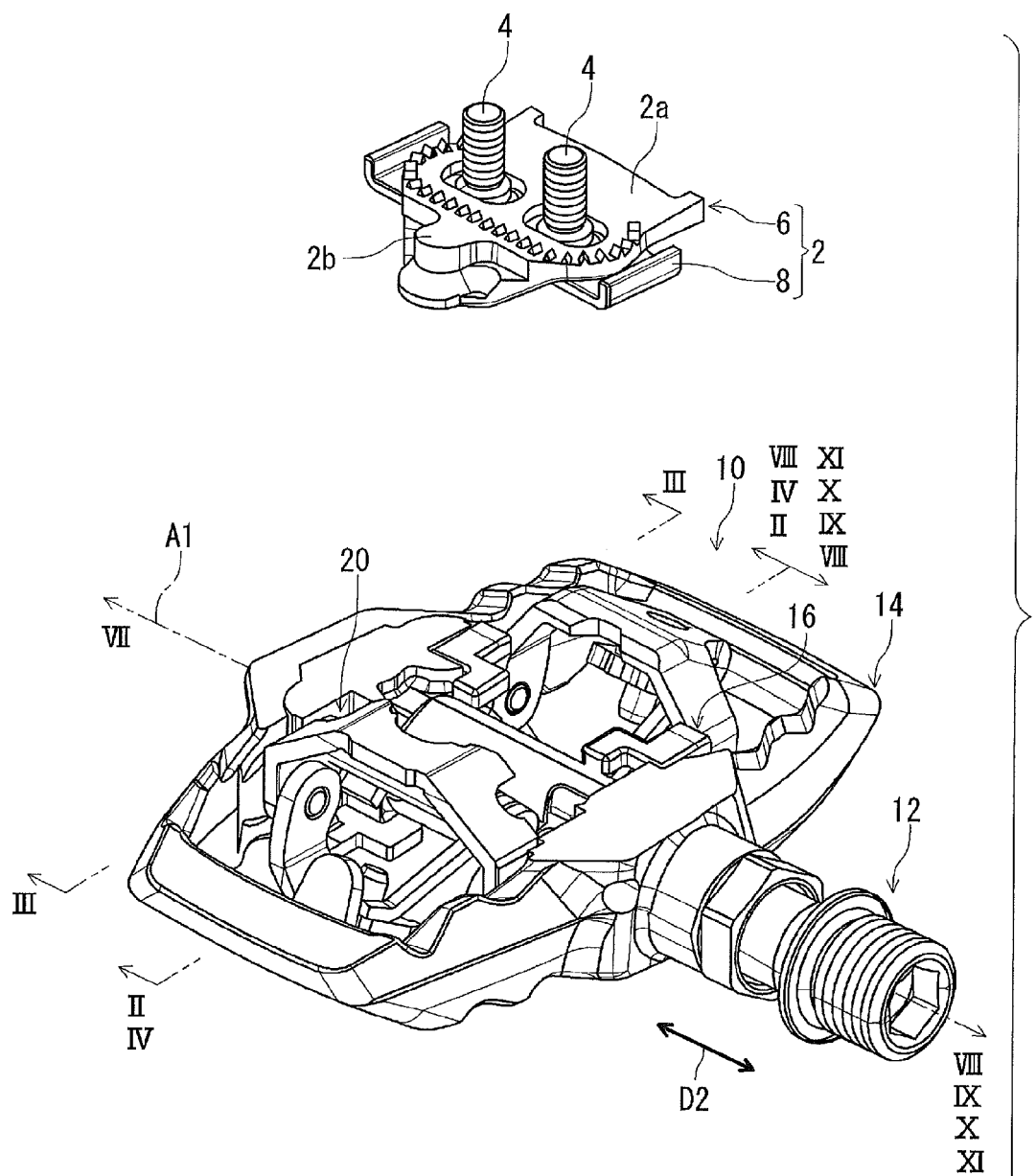
FIG. 1 is a perspective view of a bicycle pedal in accordance with a first embodiment, with a cleat.

The embodiments will now be described with reference to the accompanying drawings, wherein like reference numerals designate corresponding or identical elements throughout the various drawings.

First Embodiment

Referring initially to FIG. 1, a bicycle pedal 10 in accordance with the first embodiment comprises a pedal axle 12, a pedal body 14, a first sub member 16, a first clamping member 18, and a second clamping member 20. The pedal axle 12 is configured to be secured to a crank arm (not shown). The pedal body 14 is rotatably supported on the pedal axle 12 about a rotational axis A1.

The first sub member 16 is movably coupled to the pedal body 14. The first clamping member 18 is movably coupled to the first sub member 16. In the illustrated embodiment, the first sub member 16 is pivotably coupled to the pedal body 14. The first clamping member 18 is pivotably coupled to the first sub member 16. The second clamping member 20 is coupled to the pedal body 14 to clamp a cleat 2 together with the first clamping member 18. The cleat 2 is attached to a sole of a shoe (not shown) using bolts 4. The cleat 2 includes a cleat body 6 and an attachment plate 8.

In the illustrated embodiment, the first clamping member 18 is a rear clamping member configured to engage with a rear end 2a of the cleat 2. The second clamping member 20 is a front clamping member configured to engage with a front end 2b of the cleat 2. However, the first clamping member 18 can be a front clamping member, and the second clamping member 20 can be a rear clamping member if needed and/or desired.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle (not shown) with facing a handlebar (not shown). Accordingly, these terms, as utilized to describe the bicycle pedal 10, should be interpreted relative to the bicycle equipped with the bicycle pedal 10 as used in an upright riding position on a horizontal surface.

Figure 2:
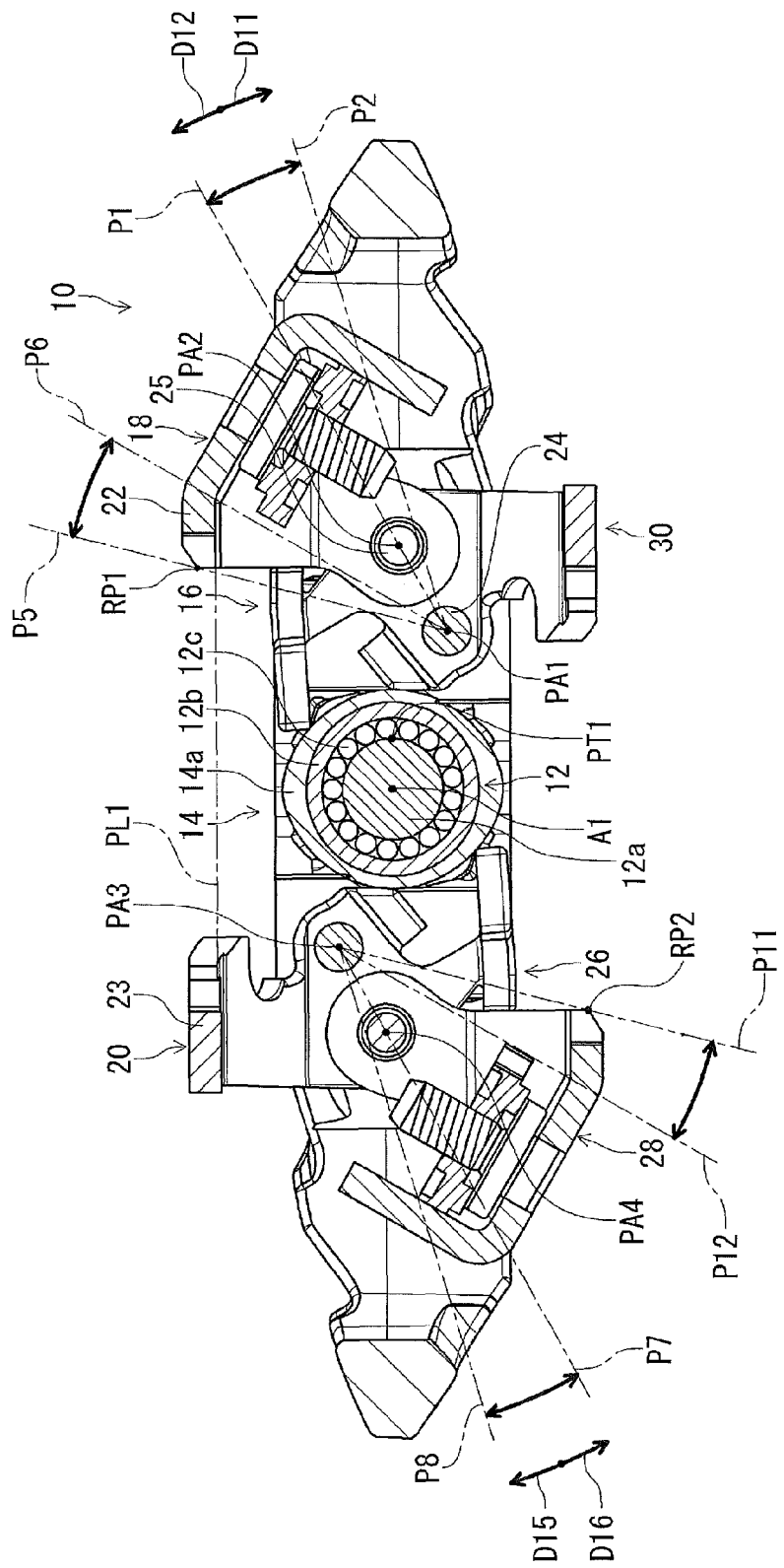
FIG. 2 is a cross-sectional view of the bicycle pedal taken along line II-II of FIG. 1.

As seen in FIG. 2, the first sub member 16 is movable relative to the pedal body 14 about a first pivot axis PA1 in a first pivot direction D11 and a second pivot direction D12 opposite to the first pivot direction D11. The first sub member 16 is movable relative to the pedal body 14 about the first pivot axis PA1 between a first position P1 and a second position P2. In the illustrated embodiment, the first sub member 16 is pivotable relative to the pedal body 14 about the first pivot axis PA1 in the first pivot direction D11 and the second pivot direction D12. The first sub member 16 is pivotable relative to the pedal body 14 about the first pivot axis PA1 between the first position P1 and the second position P2. The first sub member 16 is positioned at the first position P1 in a state where the cleat 2 (FIG. 1) is released from the bicycle pedal 10.

Figure 3:
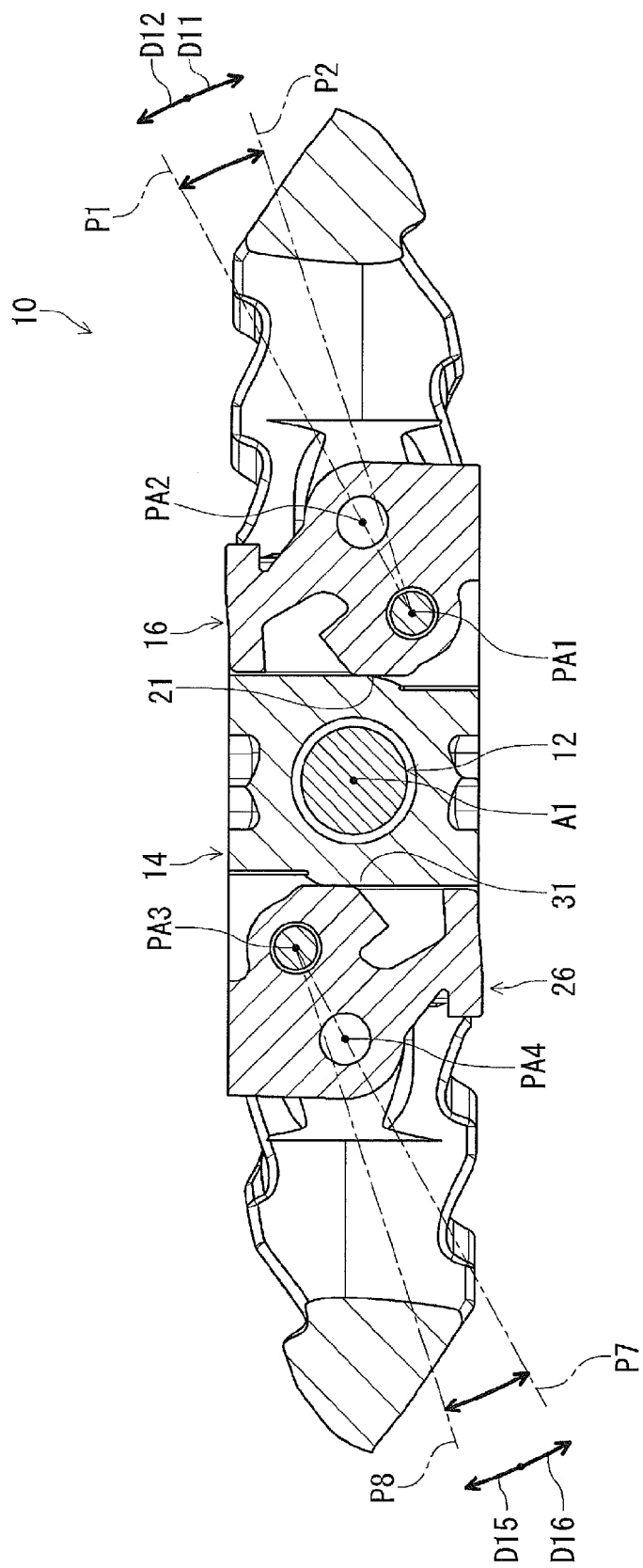
FIG. 3 is a cross-sectional view of the bicycle pedal taken along line III-III of FIG. 1.

As seen in FIG. 3, the pedal body 14 includes a restricting portion 21 configured to restrict the first sub member 16 from moving relative to the pedal body 14 in the second pivot direction D12. The restricting portion 21 is configured to restrict the first sub member 16 from pivoting relative to the pedal body 14 about the first pivot axis PA1 in the second pivot direction D12. The first sub member 16 is configured to be in contact with the restricting portion 21 to restrict the first sub member 16 from pivoting relative to the pedal body 14 about the first pivot axis PA1 in the second pivot direction D12. The first sub member 16 is positioned at the first position P1 in a state where the restricting portion 21 restricts the first sub member 16 from moving relative to the pedal body 14 in the second pivot direction D12. However, the first position P1 can be a location where the first sub member 16 is spaced apart from the restricting portion 21.

Figure 4:
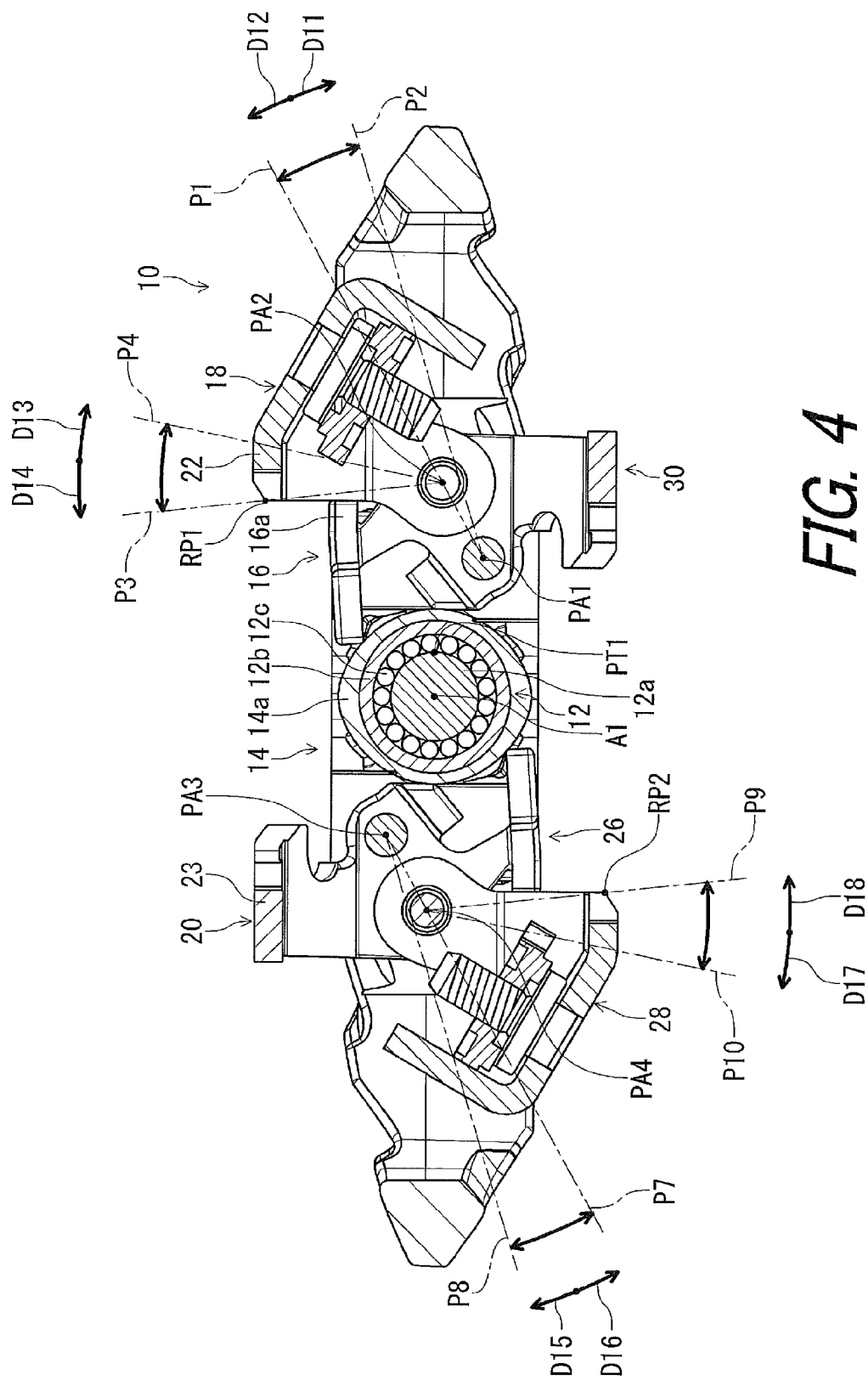
FIG. 4 is a cross-sectional view of the bicycle pedal taken along line IV-IV of FIG. 1.

As seen in FIG. 4, the first clamping member 18 is movable relative to the first sub member 16 about a second pivot axis PA2 substantially parallel to the first pivot axis PA1 in a third pivot direction D13 and a fourth pivot direction D14 opposite to the third pivot direction D13. The first clamping member 18 is movable relative to the first sub member 16 about the second pivot axis PA2 between a third position P3 and a fourth position P4. In the illustrated embodiment, the first clamping member 18 is pivotable relative to the first sub member 16 about the second pivot axis PA2 in the third pivot direction D13 and the fourth pivot direction D14. The first clamping member 18 is pivotable relative to the first sub member 16 about the second pivot axis PA2 between the third position P3 and the fourth position P4.

As seen in FIG. 4, the first clamping member 18 is positioned at the third position P3 in a state where the cleat 2 (FIG. 1) is released from the bicycle pedal 10. The first sub member 16 includes a restriction part 16a configured to restrict the first clamping member 18 from moving relative to the first sub member 16 in the fourth pivot direction D14. The restriction part 16a is configured to be in contact with the first clamping member 18. The first clamping member 18 is positioned at the third position P3 relative to the first sub member 16 in a state where the first sub member 16 restricts the first clamping member 18 from moving relative to the first sub member 16 in the fourth pivot direction D14.

In the illustrated embodiment, as seen in FIG. 4, the third position P3 and the fourth position P4 of the first clamping member 18 are defined based on the second pivot axis PA2 and a reference point RP1. The first position P1 and the second position P2 of the first sub member 16 are defined based on the first pivot axis PA1 and the second pivot axis PA2.

As seen in FIG. 2, the first clamping member 18 is pivotable together with the first sub member 16 relative to the pedal body 14 about the first pivot axis PA1. In the illustrated embodiment, the first clamping member 18 is pivotable together with the first sub member 16 relative to the pedal body 14 about the first pivot axis PA1 between a fifth position P5 and a sixth position P6. The first clamping member 18 pivots relative to the pedal body 14 about the first pivot axis PA1 between the fifth position P5 and the sixth position P6 in a state where the first clamping member 18 is positioned at the third position P3 relative to the first sub member 16 (FIG. 4). The fifth position P5 of the first clamping member 18 corresponds to the first position P1 of the first sub member 16. The sixth position P6 of the first clamping member 18 corresponds to the second position P2 of the first sub member 16.

In the illustrated embodiment, as seen in FIG. 2, the fifth position P5 and the sixth position P6 of the first clamping member 18 are defined based on the first pivot axis PA1 and a reference point RP1.

As seen in FIG. 2, the first pivot axis PA1 is substantially parallel to the rotational axis A1. The second pivot axis PA2 is substantially parallel to the rotational axis A1 and the first pivot axis PA1. More specifically, the first pivot axis PA1 is parallel to the rotational axis A1. The second pivot axis PA2 is parallel to the rotational axis A1 and the first pivot axis PA1.

The first pivot axis PA1 is closer to a point PT1 on the pedal axle 12 than the second pivot axis PA2 when viewed from an axial direction D2 (a direction perpendicular to a paper surface of FIG. 4) parallel to the first pivot axis PA1. More specifically, the first pivot axis PA1 is closer to the pedal axle 12 than the second pivot axis PA2 when viewed from the axial direction D2 (the direction perpendicular to the paper surface of FIG. 4) parallel to the first pivot axis PA1.

While the first pivot axis PA1 and the second pivot axis PA2 are substantially parallel to the rotational axis A1 in the illustrated embodiment, the first pivot axis PA1 and the second pivot axis PA2 do not need to be parallel to the rotational axis A1.

As seen in FIG. 2, the pedal body 14 includes a tubular part 14a. The pedal axle 12 includes an axle rod 12a, an outer tube 12b, and a bearing 12c. The outer tube 12b is provided in the tubular part 14a and is secured to an inner peripheral surface of the tubular part 14a. The axle rod 12a is configured to be provided in the outer tube 12b and is rotatably supported by the outer tube 12b via the bearing 12c. For example, the point PT1 is defined on an outer peripheral surface of the axle rod 12a. The first pivot axis PA1 is closer to the rotational axis A1 than the second pivot axis PA2 when viewed from the axial direction D2 (the direction perpendicular to the paper surface of FIG. 4).

While the point PT1 is defined on the outer peripheral surface of the axle rod 12a, the point PT1 can be defined at a position other than the position shown in FIG. 4 on the outer peripheral surface of the axle rod 12a. Furthermore, the point PT1 can be defined at a position other than the outer peripheral surface of the axle rod 12a in the pedal axle 12. For example, the point PT1 can be defined on an outer peripheral surface of the outer tube 12b.

As seen in FIG. 2, the first clamping member 18 includes a first cleat engagement portion 22 configured to engage the cleat 2 (FIG. 1) in a state where the first clamping member 18 and the second clamping member 20 clamp the cleat 2. The second pivot axis PA2 is closer to the first cleat engagement portion 22 than the first pivot axis PA1 when viewed from the axial direction D2 parallel to the rotational axis A1. Further, the second pivot axis PA2 is closer to the first cleat engagement portion 22 than the first pivot axis PA1 in a direction perpendicular to a cleat attachment plane PL1 (described later). The first cleat engagement portion 22 is configured to be in contact with the rear end 2a of the cleat 2 (FIG. 1).

The second clamping member 20 includes a second cleat engagement portion 23 configured to engage the cleat 2 (FIG. 1) in a state where the first clamping member 18 and the second clamping member 20 clamp the cleat 2. The second cleat engagement portion 23 is configured to be in contact with the front end 2b of the cleat 2 (FIG. 1). A cleat attachment plane PL1 is defined by the first clamping member 18 and the second clamping member 20. More specifically, the cleat attachment plane PL1 is defined by the first cleat engagement portion 22 and the second cleat engagement portion 23 in a state where the cleat 2 is removed from the bicycle pedal 10.

Figure 5:
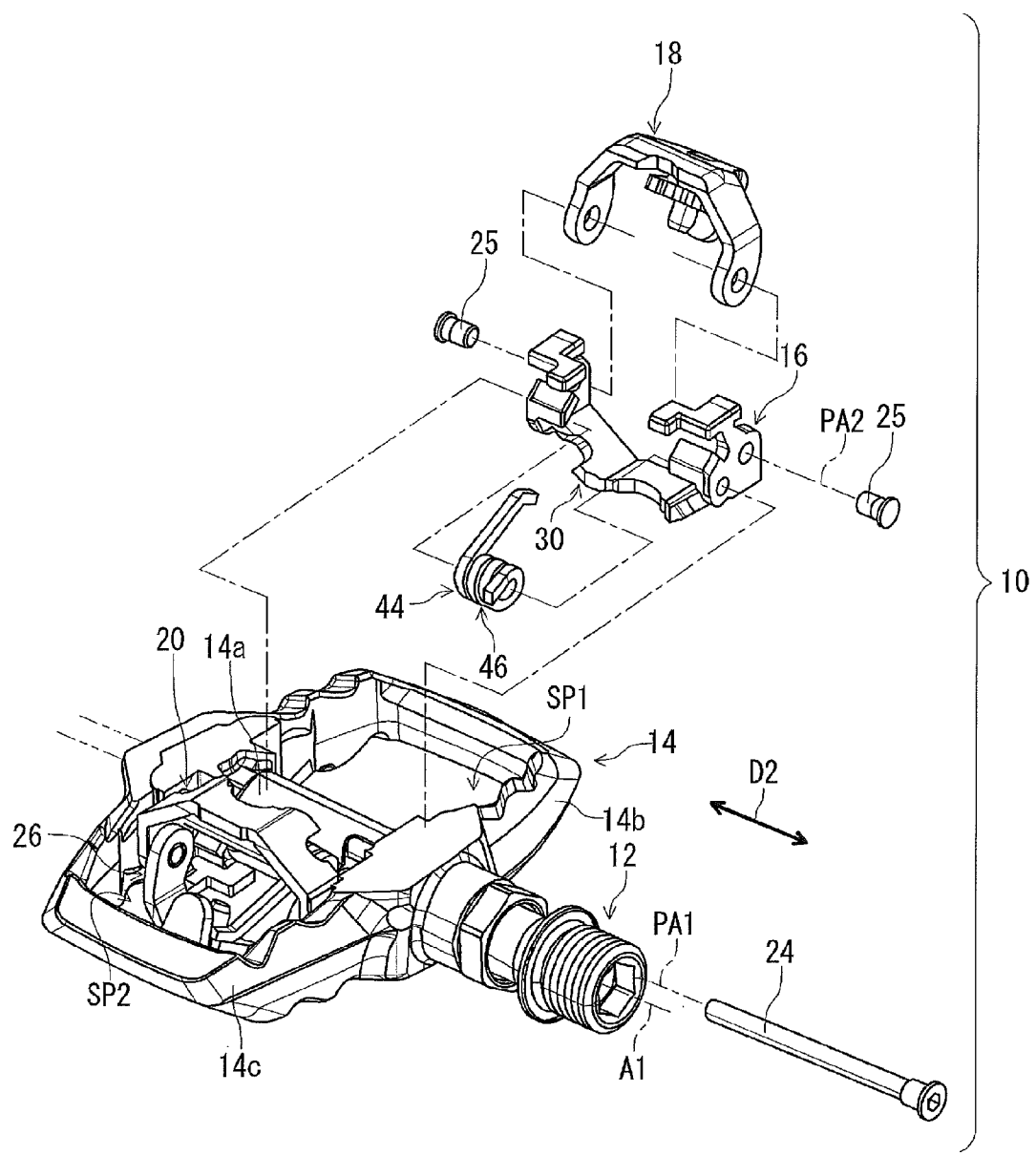
FIG. 5 is an exploded perspective view of the bicycle pedal illustrated in FIG. 1.

As seen in FIG. 5, the bicycle pedal 10 further comprises a first pivot shaft 24. The first pivot shaft 24 is configured to pivotably support the first sub member 16 about the first pivot axis PA1. The first pivot shaft 24 is attached to the pedal body 14. The first sub member 16 is pivotably coupled to the pedal body 14 about the first pivot axis PA1 by the first pivot shaft 24. As seen in FIG. 2, the first pivot axis PA1 is defined as a center axis of the first pivot shaft 24.

As seen in FIG. 5, the bicycle pedal 10 further comprises second pivot shafts 25. The second pivot shafts 25 are configured to pivotably support the first clamping member 18 about the second pivot axis PA2. The second pivot shafts 25 are attached to the first sub member 16. The first clamping member 18 is pivotably coupled to the first sub member 16 about the second pivot axis PA2 by the second pivot shafts 25. As seen in FIG. 2, the second pivot axis PA2 is defined as center axes of the second pivot shafts 25.

In the illustrated embodiment, as seen in FIG. 2, the bicycle pedal 10 is a two-sided pedal (e.g., mounting bicycle style). More specifically, the bicycle pedal 10 further comprises a second sub member 26, a third clamping member 28, and a fourth clamping member 30. The third clamping member 28 is a rear clamping member configured to engage with the rear end 2a of the cleat 2 (FIG. 1) as well as the first clamping member 18. The fourth clamping member 30 is a front clamping member configured to engage with the front end 2b of the cleat 2 (FIG. 1) as well as the second clamping member 20. However, the third clamping member 28 can be a front clamping member, and the fourth clamping member 30 can be a rear clamping member if needed and/or desired.

In the illustrated embodiment, the second sub member 26 has the same structure as the structure of the first sub member 16. The third clamping member 28 has the same structure as the structure of the first clamping member 18. The fourth clamping member 30 has the same structure as the structure of the second clamping member 20. The second sub member 26 can, however, have a different structure from the structure of the first sub member 16. The third clamping member 28 can have a different structure from the structure of the first clamping member 18. The fourth clamping member 30 can have a different structure from the structure of the second clamping member 20.

The second sub member 26, the third clamping member 28, and the fourth clamping member 30 have the same structures as the structures of the first sub member 16, the first clamping member 18, and the second clamping member 20, respectively. Accordingly, elements having substantially the same function as those in the first embodiment will be numbered the same here, and will not be described and/or illustrated in detail here for the sake of brevity.

In a case where the bicycle pedal 10 is a one-sided pedal (e.g., road style), at least one of the second sub member 26, the third clamping member 28, and the fourth clamping member 30 can be omitted from the bicycle pedal 10.

As seen in FIG. 2, the second sub member 26 is movably coupled to the pedal body 14. In the illustrated embodiment, the third clamping member 28 is pivotably coupled to the second sub member 26. The third clamping member 28 is provided on an opposite side of the first clamping member 18 relative to the pedal body 14 (the rotational axis A1). The fourth clamping member 30 is coupled to the pedal body 14 to clamp the cleat 2 (FIG. 1) together with the third clamping member 28. More specifically, the fourth clamping member 30 is pivotably coupled to the pedal body 14. The fourth clamping member 30 is provided on an opposite side of the second clamping member 20 relative to the pedal body 14 (the rotational axis A1).

As seen in FIG. 2, the second sub member 26 is movable relative to the pedal body 14 about a third pivot axis PA3 in a fifth pivot direction D15 and a sixth pivot direction D16 opposite to the fifth pivot direction D15. The second sub member 26 is movable relative to the pedal body 14 about the third pivot axis PA3 between a seventh position P7 and an eighth position P8. In the illustrated embodiment, the second sub member 26 is pivotable relative to the pedal body 14 about a third pivot axis PA3 in a fifth pivot direction D15 and a sixth pivot direction D16 opposite to the fifth pivot direction D15. The second sub member 26 is pivotable relative to the pedal body 14 about the third pivot axis PA3 between a seventh position P7 and an eighth position P8. The second sub member 26 is positioned at the seventh position P7 in a state where the cleat 2 (FIG. 1) is released from the bicycle pedal 10.

As seen in FIG. 3, the pedal body 14 includes an additional restricting portion 31 configured to restrict the second sub member 26 from moving relative to the pedal body 14 in the sixth pivot direction D16. The additional restricting portion 31 is configured to restrict the second sub member 26 from pivoting relative to the pedal body 14 about the third pivot axis PA3 in the sixth pivot direction D16. The second sub member 26 is configured to be in contact with the additional restricting portion 31. The second sub member 26 is positioned at the seventh position P7 in a state where the additional restricting portion 31 restricts the second sub member 26 from moving relative to the pedal body 14 in the sixth pivot direction D16.

As seen in FIG. 4, the third clamping member 28 is movable relative to the second sub member 26 about a fourth pivot axis PA4 substantially parallel to the third pivot axis PA3 in a seventh pivot direction D17 and an eighth pivot direction D18 opposite to the seventh pivot direction D17. The third clamping member 28 is movable relative to the second sub member 26 about the fourth pivot axis PA4 between a ninth position P9 and a tenth position P10. In the illustrated embodiment, the third clamping member 28 is pivotable relative to the second sub member 26 about the fourth pivot axis PA4 in the seventh pivot direction D17 and the eighth pivot direction D18. The third clamping member 28 is pivotable relative to the second sub member 26 about the fourth pivot axis PA4 between the ninth position P9 and the tenth position P10.

In the illustrated embodiment, as seen in FIG. 4, the ninth position P9 and the tenth position P10 of the third clamping member 28 are defined based on the fourth pivot axis PA4 and a reference point RP2. The seventh position P7 and the eighth position P8 of the second sub member 26 are defined based on the third pivot axis PA3 and the fourth pivot axis PA4.

The third pivot axis PA3 is substantially parallel to the rotational axis A1, the first pivot axis PA1, and the second pivot axis PA2. The fourth pivot axis PA4 is substantially parallel to the rotational axis A1, the first pivot axis PA1, the second pivot axis PA2, and the third pivot axis PA3. The third pivot axis PA3 is closer to the point PT1 on the pedal axle 12 than the fourth pivot axis PA4 when viewed from an axial direction D2 parallel to the third pivot axis PA3. More specifically, the third pivot axis PA3 is closer to the pedal axle 12 than the fourth pivot axis PA4 when viewed from the axial direction D2 parallel to the third pivot axis PA3.

While the third pivot axis PA3 and the fourth pivot axis PA4 are substantially parallel to the rotational axis A1 in the illustrated embodiment, the third pivot axis PA3 and the fourth pivot axis PA4 do not need to be parallel to the rotational axis A1.

As seen in FIG. 2, the third clamping member 28 is pivotable together with the second sub member 26 relative to the pedal body 14 about the third pivot axis PA3. In the illustrated embodiment, the third clamping member 28 is pivotable together with the second sub member 26 relative to the pedal body 14 about the third pivot axis PA3 between an eleventh position P11 and a twelfth position P12. The third clamping member 28 pivots relative to the pedal body 14 about the third pivot axis PA3 between the eleventh position P11 and the twelfth position P12 in a state where the third clamping member 28 is positioned at the ninth position P9 relative to the second sub member 26 (FIG. 4). The eleventh position P11 of the third clamping member 28 corresponds to the seventh position P7 of the second sub member 26. The twelfth position P12 of the third clamping member 28 corresponds to the eighth position P8 of the second sub member 26.

As seen in FIG. 5, the pedal body 14 includes a first frame 14b and a second frame 14c. The tubular part 14a extends in the axial direction D2. The tubular part 14a is rotatably supported on the pedal axle 12. The first frame 14b is secured to the tubular part 14a. The second frame 14c is secured to the tubular part 14a and is opposite to the first frame 14b. The tubular part 14a and the first frame 14b defines a first space SP1. The first sub member 16 and the first clamping member 18 are at least partially provided in the first space SP1. The tubular part 14a and the second frame 14c defines a second space SP2. The second sub member 26 and the third clamping member 28 are at least partially provided in the second space SP2.

In the illustrated embodiment, the first frame 14b and the second frame 14c are integrally provided with the tubular part 14a as a single unitary member. However, at least one of the first frame 14b and the second frame 14c can be a separate member from the tubular part 14a if needed and/or desired.

Figure 6:
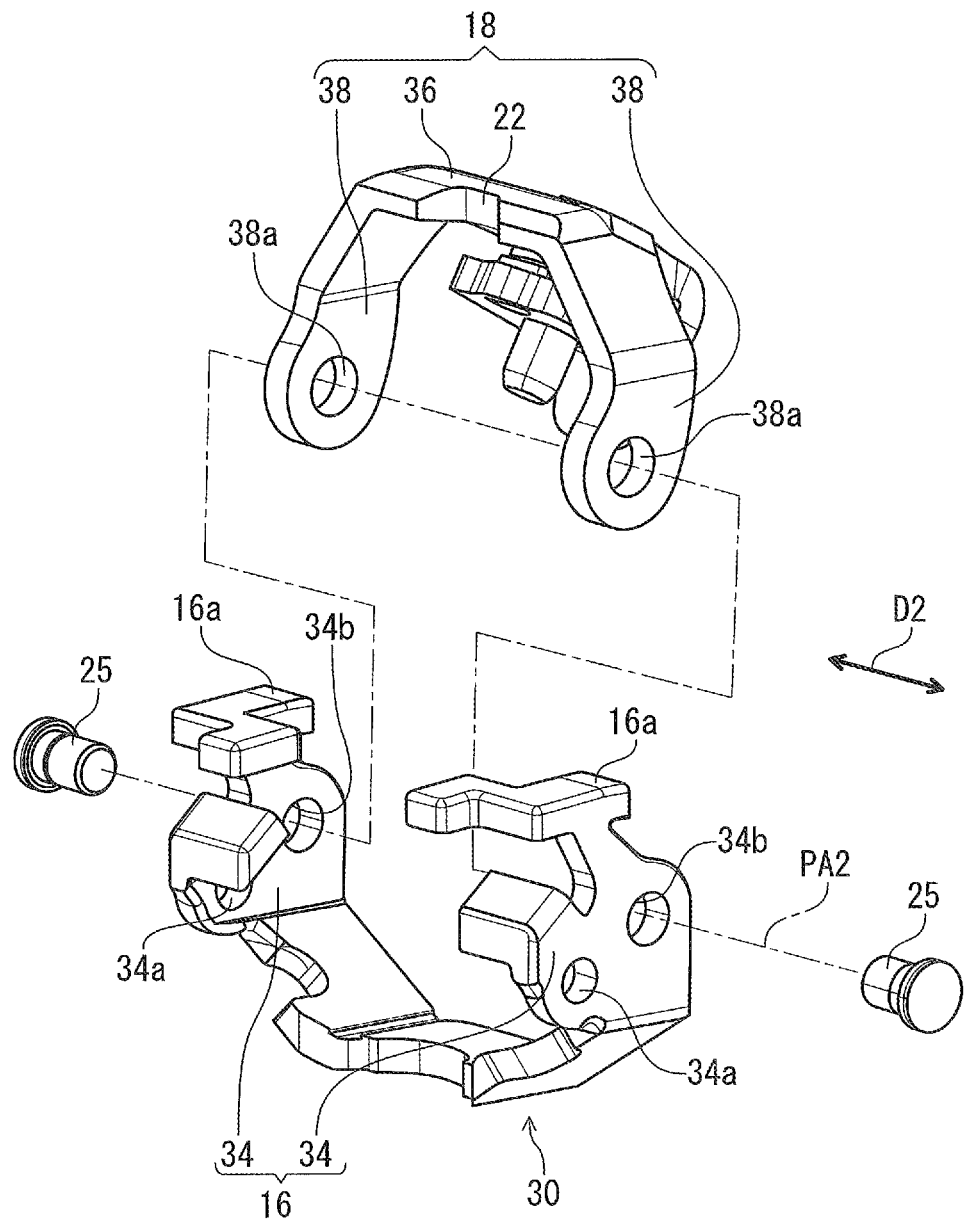
FIG. 6 is a partial exploded perspective view of the bicycle pedal illustrated in FIG. 1.

As seen in FIG. 6, the first sub member 16 is integrally provided with the fourth clamping member 30. In the illustrated embodiment, the first sub member 16 is integrally provided with the fourth clamping member 30 as a single unitary member. The fourth clamping member 30 is pivotable relative to the pedal body 14 about the first pivot axis PA1 together with the first sub member 16. The first sub member 16 can, however, be a separate member from the fourth clamping member 30.

The first sub member 16 includes a pair of coupling portions 34 spaced apart from each other in the axial direction D2. The coupling portions 34 are coupled to each other by the fourth clamping member 30. Each of the coupling portions 34 includes a first pivot hole 34a and a second pivot hole 34b. The first pivot shaft 24 (FIG. 5) extends through the first pivot holes 34a. The second pivot shafts 25 respectively extend through the second pivot holes 34b.

As seen in FIG. 6, the first clamping member 18 includes a clamping body 36 and a pair of attachment portions 38. The clamping body 36 includes the first cleat engagement portion 22 configured to engage with the rear end 2a of the cleat 2 (FIG. 1). The attachment portions 38 are coupled to each other by the clamping body 36. The attachment portions 38 protrude from the clamping body 36 and are spaced apart from each other in the axial direction D2. Each of the attachment portions 38 includes a pivot hole 38a. The second pivot shaft 25 extends through the pivot hole 38a to pivotably support the first clamping member 18 relative to the first sub member 16 about the second pivot axis PA2.

In the illustrated embodiment, the attachment portions 38 are integrally provided with the clamping body 36 as a single unitary member. However, at least one of the attachment portions 38 can be a separate member from the clamping body 36 if needed and/or desired.

Figure 7:
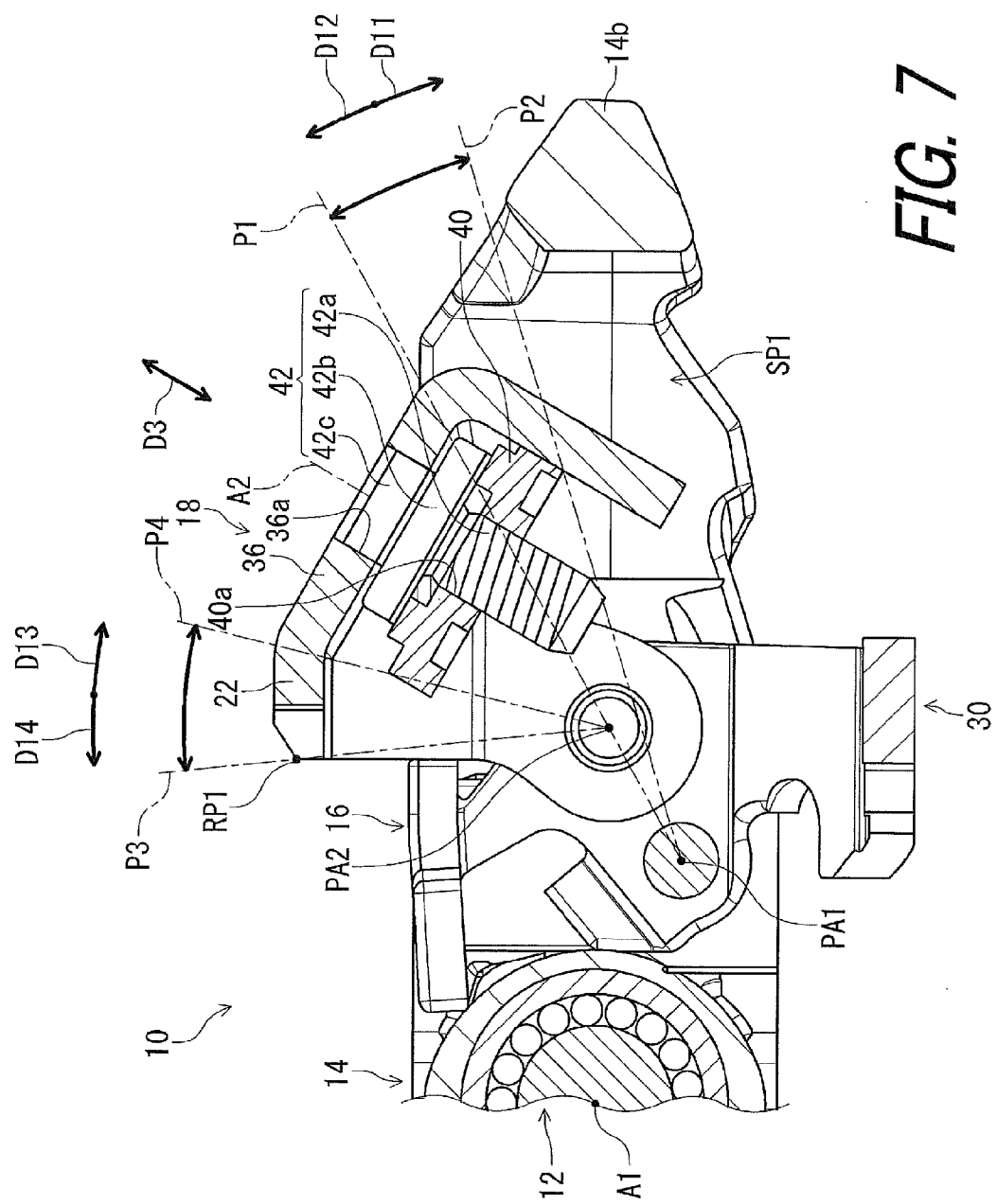
FIG. 7 is a partial exploded perspective view of the bicycle pedal taken along line VII-VII of FIG. 1.

As seen in FIG. 7, the first clamping member 18 further includes an adjustment plate 40 and an adjustment bolt 42. The adjustment plate 40 has a threaded hole 40a. The adjustment bolt 42 includes a thread bolt 42a, a flange portion 42b, and a head portion 42c. The adjustment bolt 42 protrudes from the flange portion 42b. The head portion 42c protrudes from the flange portion 42b toward an opposite side of the thread bolt 42a. The thread bolt 42a is screwed in the threaded hole 40a. The flange portion 42b is provided between the adjustment plate 40 and the clamping body 36. The flange portion 42b engages with the clamping body 36. The clamping body 36 includes a through-hole 36a. The head portion 42c is provided in the through-hole 36a. The adjustment bolt 42 is rotatable relative to the clamping body 36 and the adjustment plate 40 about a center axis A2 of the adjustment bolt 42.

The clamping body 36 is configured to guide the adjustment plate 40 in an adjustment direction D3 parallel to the center axis A2 of the adjustment bolt 42. The clamping body 36 is configured to prevent the adjustment plate 40 from rotating relative to the clamping body 36 about the center axis A2. Rotation of the adjustment bolt 42 relative to the clamping body 36 moves the adjustment plate 40 relative to the clamping body 36 in the adjustment direction D3.

Figure 8:
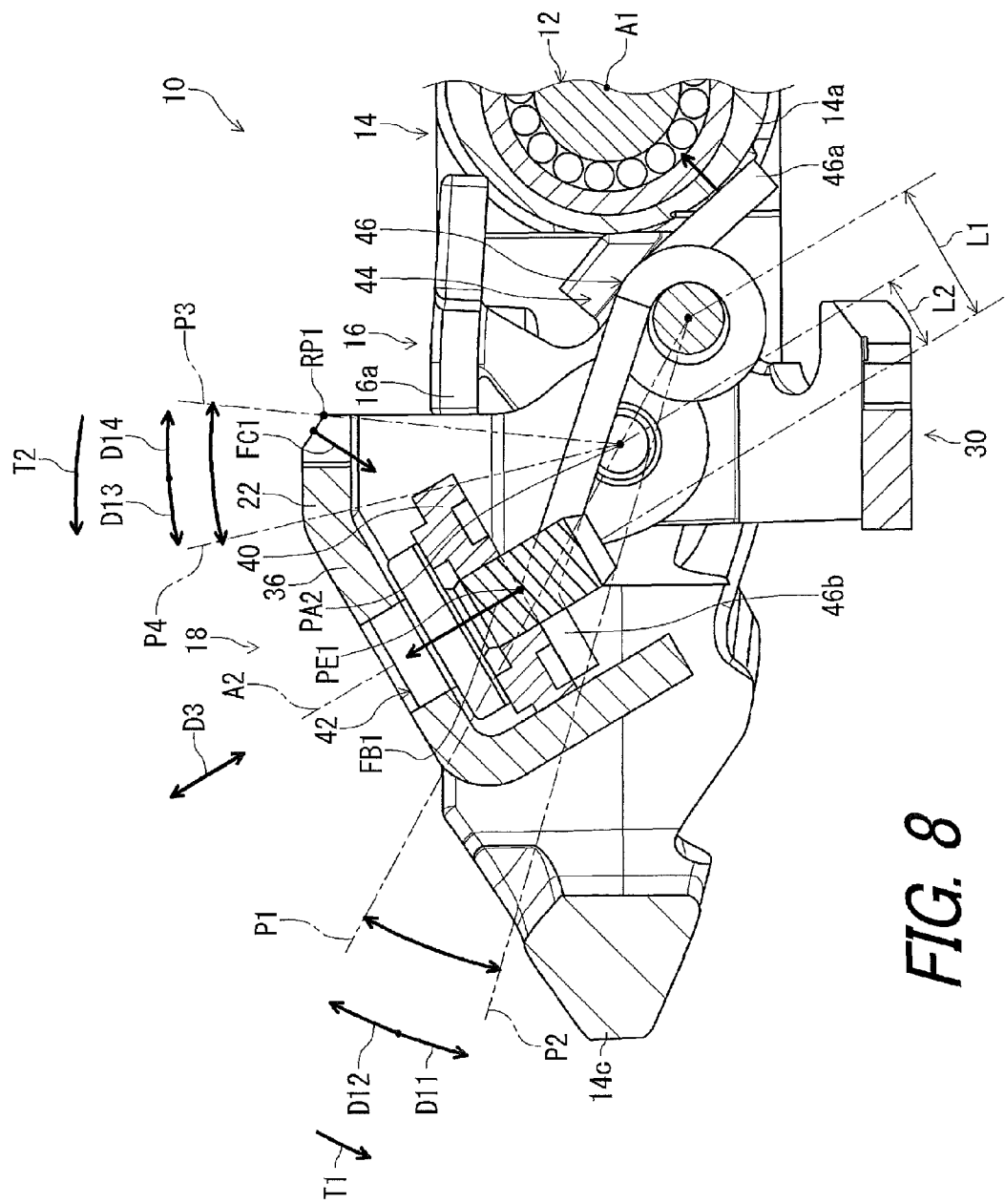
FIG. 8 is a partial enlarged cross-sectional view of the bicycle pedal taken along line VIII-VIII of FIG. 1.

As seen in FIG. 8, the bicycle pedal 10 comprises a biasing structure 44. The biasing structure 44 is configured to bias the first clamping member 18 in the fourth pivot direction D14 and the first sub member 16 in the second pivot direction D12. The biasing structure 44 is configured to bias the first clamping member 18 toward the third position P3. The biasing structure 44 is configured to bias the first sub member 16 toward the first position P1 in a state where the restriction part 16a restricts the first clamping member 18 from moving relative to the first sub member 16 in the second pivot direction D12. In the illustrated embodiment, the biasing structure 44 is configured to bias the first clamping member 18 (the adjustment plate 40) toward the third position P3 so that the first sub member 16 is biased toward the first position P1.

As seen in FIG. 5, the biasing structure 44 includes a first biasing member 46. In the illustrated embodiment, for example, the first biasing member 46 is a torsion spring. However, the first biasing member 46 can be a biasing member other than the torsion spring. Furthermore, the biasing structure 44 can include a plurality of biasing members to bias the first clamping member 18 and the first sub member 16.

The first pivot shaft 24 extends through the first biasing member 46. The first biasing member 46 is mounted to the pedal body 14 with the first pivot shaft 24. Thus, the first biasing member 46 is mounted on the first pivot axis PA1. However, the first biasing member 46 can be mounted on the second pivot axis PA2 or at the other location in the bicycle pedal body 10.

As seen in FIG. 8, the first biasing member 46 is configured to bias the first clamping member 18 relative to the pedal body 14 toward the third position P3 in the fourth pivot direction D14. The first biasing member 46 includes a first end 46a and a second end 46b. The first end 46a is configured to engage with the pedal body 14. The second end 46b is configured to engage with the first clamping member 18.

In the illustrated embodiment, the first end 46a is configured to engage with the tubular part 14a of the pedal body 14. The second end 46b is configured to engage with the adjustment plate 40 of the first clamping member 18 at an engagement point PE1. The first biasing member 46 is configured to bias the first sub member 16 relative to the pedal body 14 in the second pivot direction D12 in a state where the first clamping member 18 is in contact with the restriction part 16a of the first sub member 16.

A first biasing force FB1 is applied to the first clamping member 18 (the adjustment plate 40) by the first biasing member 46 at the engagement point PE1. The first biasing force FB1 can be defined on the center axis A2 of the adjustment bolt 42, for example.

As seen in FIG. 8, the second pivot axis PA2 is closer to the center axis A2 of the adjustment bolt 42 than the first pivot axis PA1. A first minimum distance L1 is defined between the first pivot axis PA1 and the center axis A2. A second minimum distance L2 is defined between the second pivot axis PA2 and a line intersecting with the engagement point PE1 and parallel to the direction of the first biasing force FB1. The line is substantially identical with the center axis A2 in the first embodiment. The second minimum distance L2 is shorter than the first minimum distance L1.

In a step-in operation of the bicycle pedal 10, a first torque T1 is needed to pivot the first sub member 16 about the first pivot axis PA1 in the first pivot direction D11. In a step-out operation of the bicycle pedal 10, a second torque T2 is needed to pivot the first clamping member 18 about the second pivot axis PA2 in the third pivot direction D13. The first torque T1 can be less than the second torque T2. In the illustrated embodiment, the first torque T1 can also be defined as a torque to pivot the first clamping member 18 about the first pivot axis PA1 toward the sixth position P6 together with the first sub member 16. The step-in operation is an operation in which a user (a rider) clips the cleat 2 of the shoe into the bicycle pedal 10. The step-out operation is an operation in which the user (the rider) releases the cleat 2 of the shoe from the bicycle pedal 10.

With the bicycle pedal 10, a pivot axis of the first clamping member 18 is switched between the first pivot axis PA1 and the second pivot axis PA2 in the step-in operation and the step-out operation. The rationale to switch the pivot axis of the first clamping member 16 will be described below.

Figure 9:
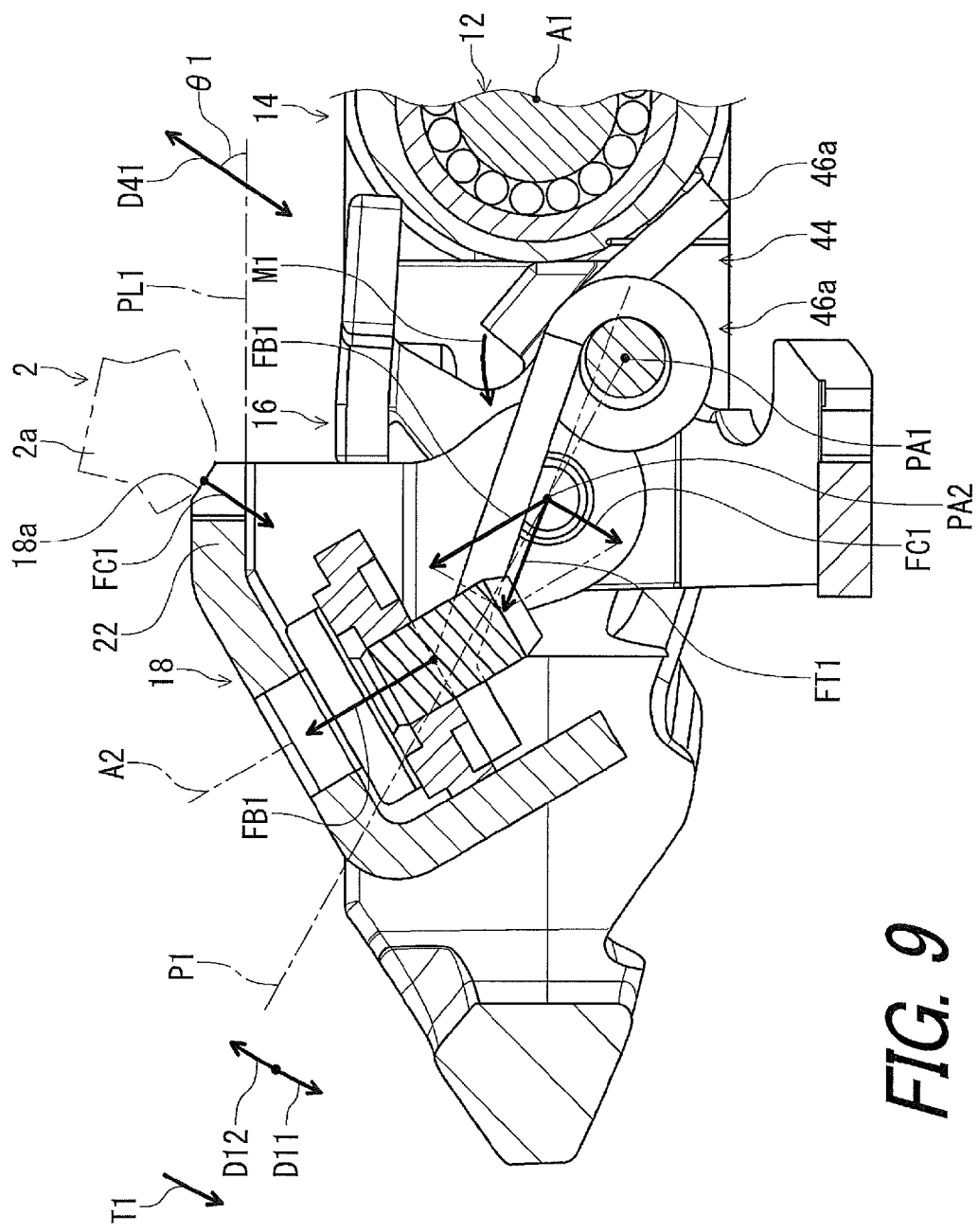
FIG. 9 is a partial enlarged cross-sectional view of the bicycle pedal taken along line XI-XI of FIG. 1.

As seen in FIG. 9, a first force FC1 is applied from the cleat 2 to the first clamping member 18 in a step-in operation of the bicycle pedal 10. In the illustrated embodiment, the first clamping member 18 includes a contact surface 18a configured to come into contact with the rear end 2a of the cleat 2. The first force FC1 directs in a direction perpendicular to the contact surface 18a. The first force FC1 directs in a first force direction D41 to provide a first force angle θ1 between the first force direction D41 and the cleat attachment plane PL1 defined by the first clamping member 18 and the second clamping member 20.

As seen in FIG. 9, a first total force FT1 of the first biasing force FB1 and the first force FC1 is applied to the first clamping member 18 in the step-in operation of the bicycle pedal 10. It can be thought that the first total force FT1 is applied at the second pivot axis PA2. Since the first total force FT1 is offset from the first pivot axis PA1 and the first total force FT1 is inclined downwardly with respect to a line including the first pivot axis PA1 and the second pivot axis PA2, a first rotational moment M1 (a first sub torque) is applied to the first sub member 16 about the first pivot axis PA1 in the first pivot direction D11. Thus, the first sub member 16 is moved relative to the pedal body 14 about the first pivot axis PA1 in the first pivot direction D11.

Namely, the first sub member 16, the first pivot axis PA1, the first clamping member 18, the second pivot axis PA2 and the biasing structure 44 are configured such that the first sub member 16 is moved relative to the pedal body 14 about the first pivot axis PA1 in the first pivot direction D11 in a state where the first force FC1 to move the first clamping member 18 in the first pivot direction D11 is applied to the first clamping member 18. More specifically, the first sub member 16 and the first clamping member 18 are pivoted relative to the pedal body 14 about the first pivot axis PA1 in the first pivot direction D11 in the step-in operation of the bicycle pedal 10.

Figure 10:
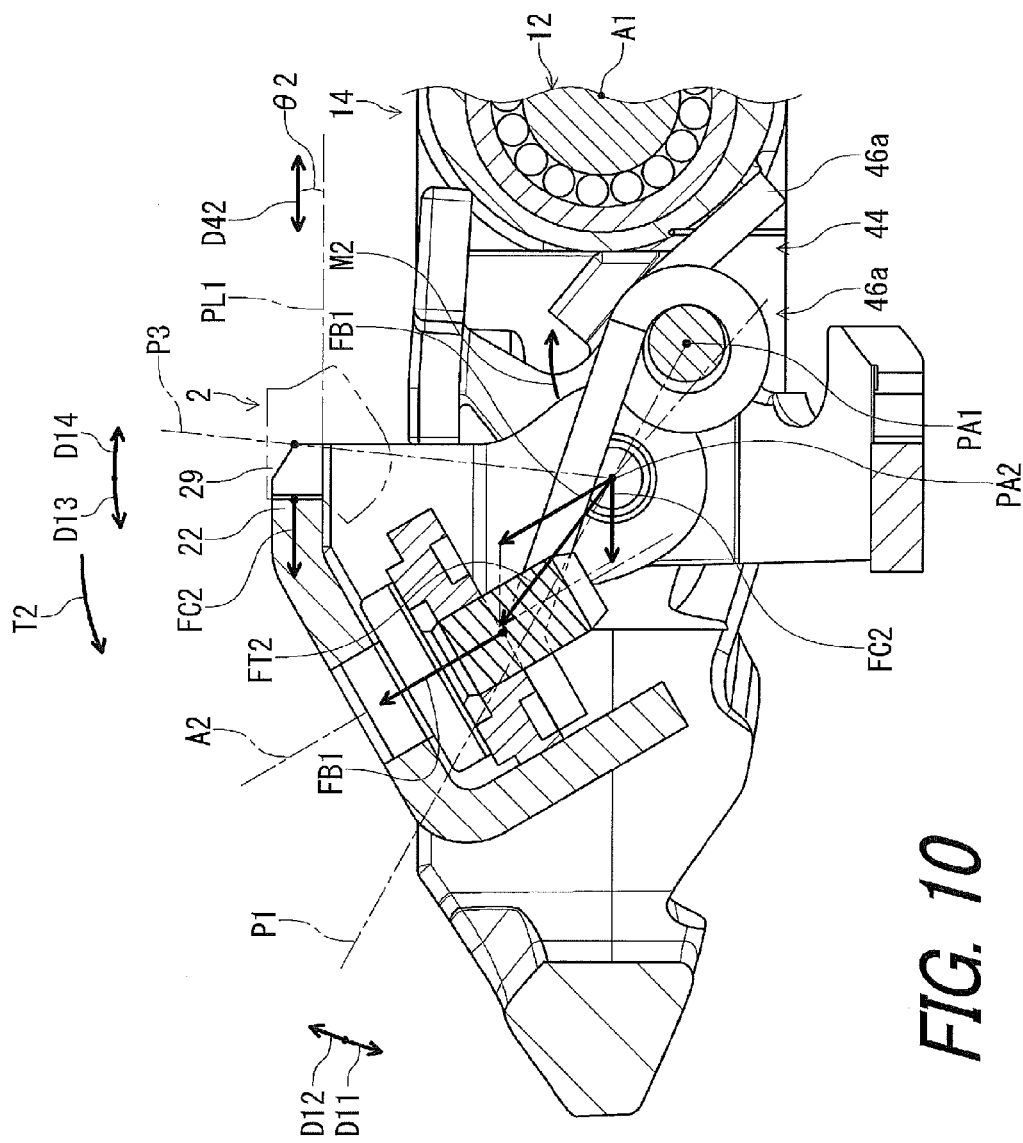
FIG. 10 is a partial enlarged cross-sectional view of the bicycle pedal taken along line X-X of FIG. 1.

On the other hand, as seen in FIG. 10, a second force FC2 is applied from the cleat 2 to the first clamping member 18 in a step-out operation of the bicycle pedal. During the step-out operation, the user twists the shoe about a vertical axis to apply the second force FC2 via the cleat 2 to the first clamping member 18.

The first force FC1 directs in a direction different from a direction of the second force FC2. The second force FC2 directs in a second force direction D42 to provide a second force angle θ2 between the second force direction D42 and the cleat attachment plane PL1. Unlike the step-in operation, the second force FC2 directs in the second force direction D42 substantially parallel to the cleat attachment plane PL1 since the cleat 2 is twisted about the vertical axis substantially perpendicular to the cleat attachment plane PL1.

As seen in FIGS. 9 and 10, the first force angle θ1 is larger than the second force angle θ2. In the illustrated embodiment, for example, the first force angle θ1 is approximately 45 degrees while the second force angle θ2 is approximately 0 degrees.

As seen in FIG. 10, a second total force FT2 of the first biasing force FB1 and the second force FC2 is applied to the first clamping member 18 in the step-out operation of the bicycle pedal 10. It can be thought that the second total force FT2 is applied at the second pivot axis PA2. Since the second total force FT2 is offset from the first pivot axis PA1 and the second total force FT2 is inclined upwardly with respect to the line including the first pivot axis PA1 and the second pivot axis PA2, a second rotational moment M2 (a second sub torque) is applied to the first sub member 16 about the first pivot axis PA1 in the second pivot direction D12. Thus, the first sub member 16 stays at the first position P1 with being restricted by restricting portion 21 or is moved relative to the pedal body 14 about the first pivot axis PA1 in the second pivot direction D12 until the first sub member 16 contacts the restricting portion 21.

Namely, the first sub member 16, the first pivot axis PA1, the first clamping member 18, the second pivot axis PA2 and the biasing structure 44 are configured such that the first sub member 16 stays or is moved relative to the pedal body 14 about the first pivot axis PA1 in the second pivot direction D12 in a state where the second force FC2 to move the first clamping member 18 in the third pivot direction D13 is applied to the first clamping member 18.

More specifically, in a state where the restricting portion 21 (FIG. 3) restricts the first sub member 16 from pivoting in the second pivot direction D12 relative to the pedal body 14, the first sub member 16 stays at the first position P1 relative to the pedal body 14 in the step-out operation. At this time, the first clamping member 18 is pivoted about the second pivot axis PA2 relative to the first sub member 16 in the third pivot direction D13 due to the second force FC2.

In a state where the first sub member 16 is spaced apart from the restricting portion 21 (FIG. 3), the first sub member 16 is moved relative to the pedal body 14 about the first pivot axis PA1 in the second pivot direction D12 in the step-out operation. At this time, the first clamping member 18 is pivoted about the second pivot axis PA2 relative to the first sub member 16 in the third pivot direction D13 due to the second force FC2. After the first sub member 16 comes into contact with the restricting portion 21, the first sub member 16 stays at the first position P1 relative to the pedal body 14, and the first clamping member 18 is further pivoted about the second pivot axis PA2 relative to the first sub member 16 in the third pivot direction D13 due to the second force FC2.

Figure 11:
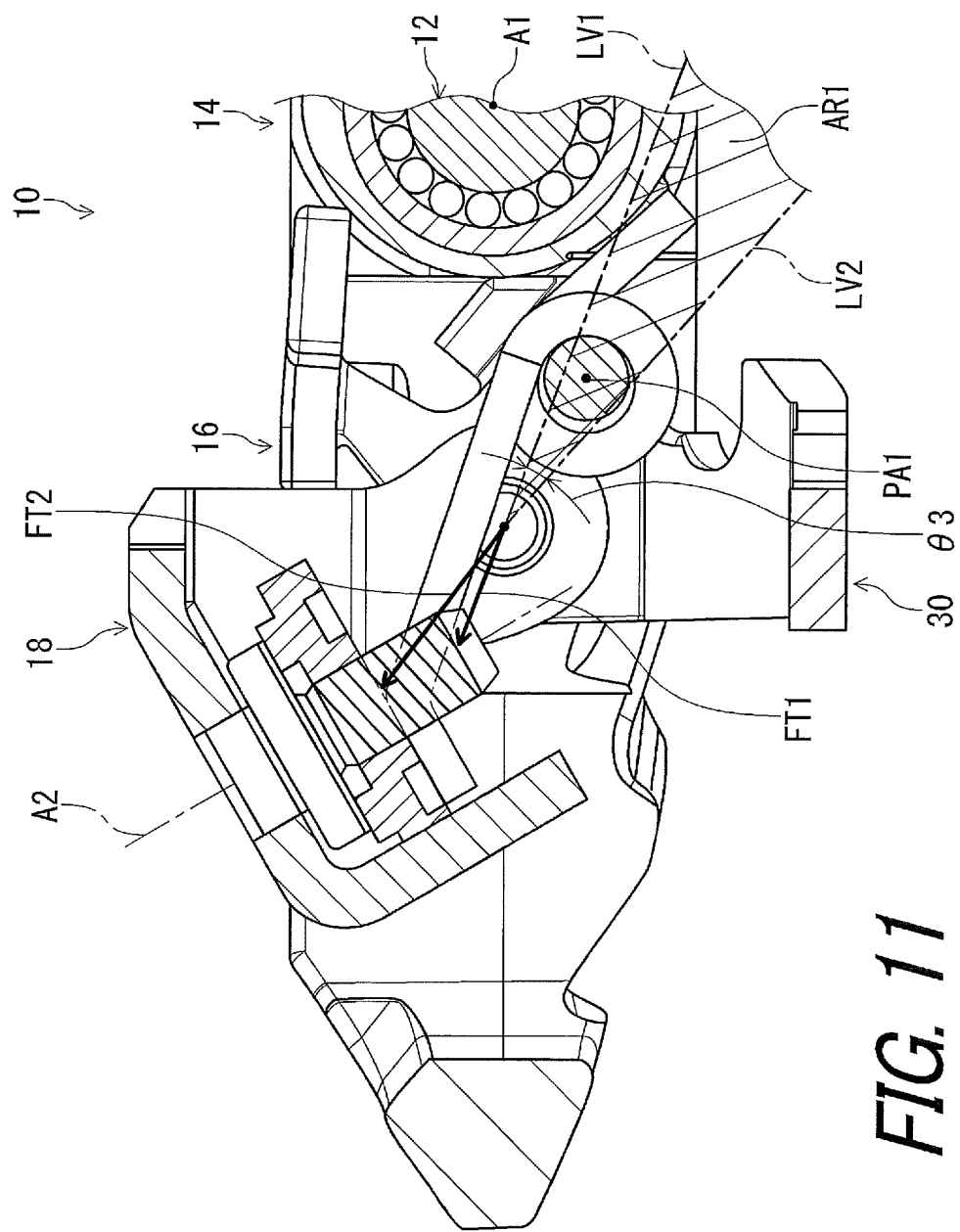
FIG. 11 is a partial enlarged cross-sectional view of the bicycle pedal taken along line XI-XI of FIG. 1.

As seen in FIG. 11, the first total force FT1 is defined on a first virtual line LV1 passing through the second pivot axis PA2 when viewed from the axial direction D2 (a direction perpendicular to a paper surface of FIG. 11). The second total force FT2 is defined on a second virtual line LV2 passing through the second pivot axis PA2 when viewed from the axial direction D2. The second virtual line LV2 intersects with the first virtual line LV1 at the second pivot axis PA2 to provide a third angle θ3 between the first virtual line LV1 and the second virtual line LV2. In the illustrated embodiment, the third angle θ3 is an acute angle. The first pivot axis PA1 is disposed in an area AR1 defined between the first virtual line LV1 and the second virtual line LV2 with the third angle θ3 when viewed from the axial direction D2.

With the bicycle pedal 10, as seen in FIG. 4, the first pivot axis PA1 is closer to the point PT1 on the pedal axle 14 than the second pivot axis PA2 when viewed from the axial direction D2 parallel to the first pivot axis PA1. This arrangement enables switching the pivot axis of the first clamping member 18 between the first pivot axis PA1 and the second pivot axis PA2 in the step-in operation and the step-out operation. Thus, the first torque T1 to pivot the first sub member 16 about the first pivot axis PA1 in the first pivot direction D11 in the step-in operation can be less than the second torque T2 to pivot the first clamping member 18 about the second pivot axis PA2 in the third pivot direction D13 in the step-out operation, by adjusting biasing force applied to the first clamping member 18 and the first sub member, respectively. Accordingly, it is possible to make the step-in operation easier for the user while the cleat 2 is strongly held by the bicycle pedal 10 so that the cleat 2 is prevented from being unintentionally released from the bicycle pedal 10.

Second Embodiment

A bicycle pedal 210 in accordance with a second embodiment will be described below referring to FIGS. 12 to 14. The bicycle pedal 210 has the same configuration as the bicycle pedal 10 except for the biasing structure 44. Thus, elements having substantially the same function as those in the first embodiment will be numbered the same here, and will not be described and/or illustrated again in detail here for the sake of brevity.

Figure 12:
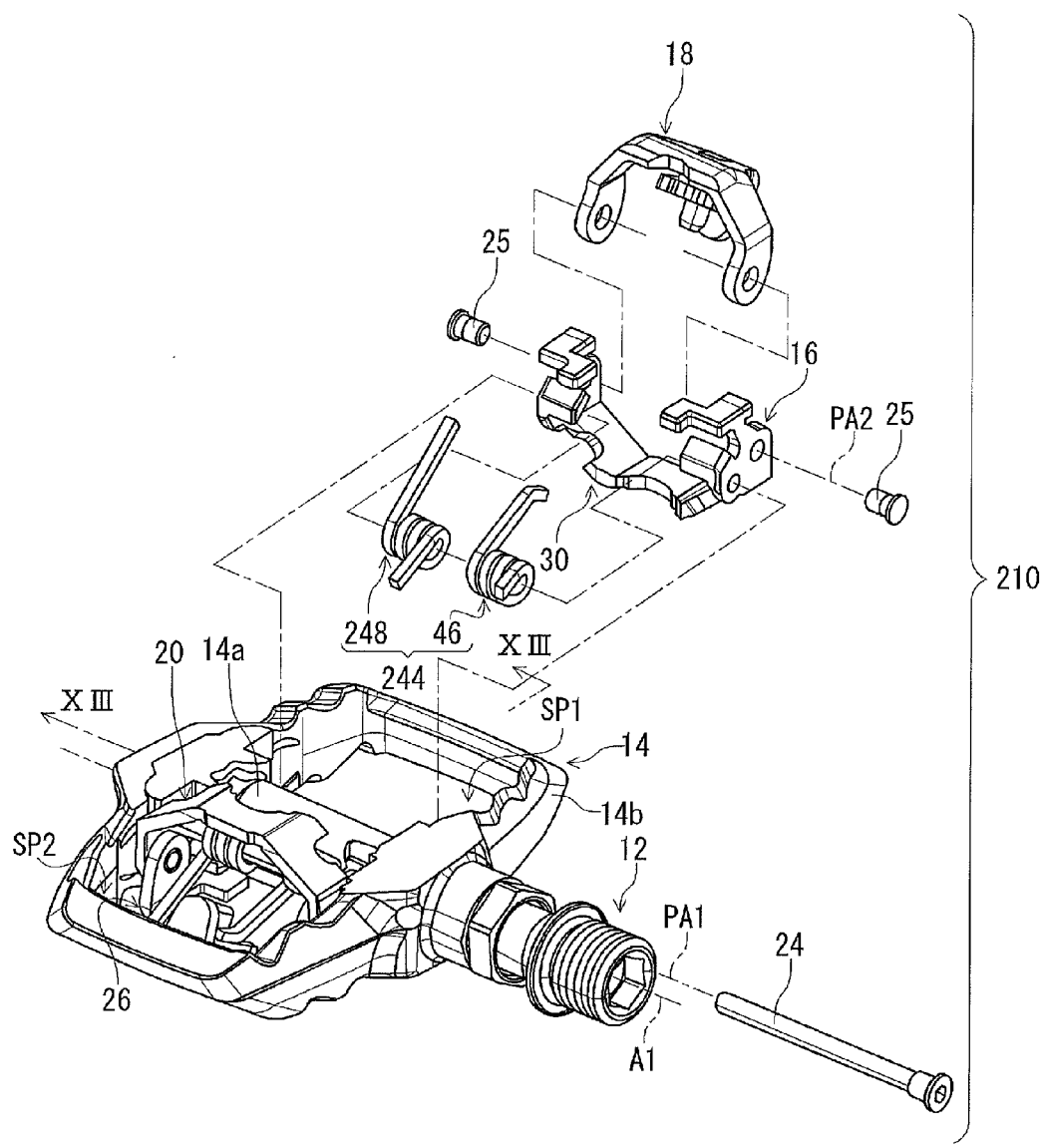
FIG. 12 is an exploded perspective view of a bicycle pedal in accordance with a second embodiment.

As seen in FIG. 12, the bicycle pedal 210 comprises a biasing structure 244. The biasing structure 244 includes the first biasing member 46 and a second biasing member 248.

Figure 13:
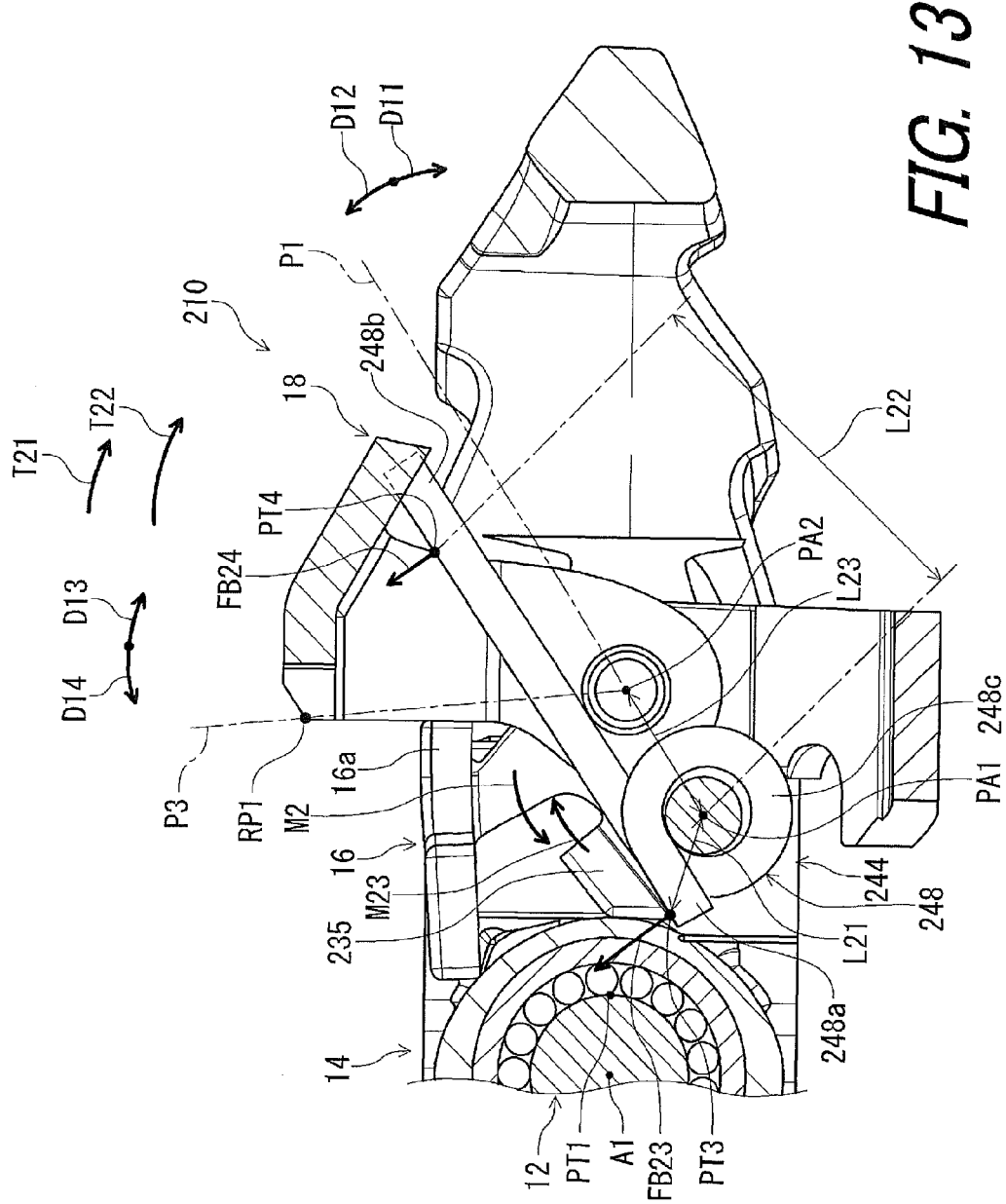
FIG. 13 is a partial enlarged cross-sectional view of the bicycle pedal taken along line XIII-XIII of FIG. 12.

As seen in FIG. 13, the biasing structure 244 is configured to bias the first clamping member 18 in the fourth pivot direction D14 and the first sub member 16 in the second pivot direction D12. The second biasing member 248 is configured to bias the first clamping member 18 relative to the first sub member 16 in the fourth pivot direction D14.

The second biasing member 248 includes a third end 248a and a fourth end 248b. The third end 248a is configured to engage with the first sub member 16. The fourth end 248b is configured to engage with the clamping body 36. The first pivot shaft 24 extends through the second biasing member 248. The second biasing member 248 includes a coiled body 248c configured to generate a biasing force. The third end 248a and the fourth end 248b are connected with both ends of the coiled body 248c, respectively. The first pivot shaft 24 extends through the coiled body 248c.

Figure 14:
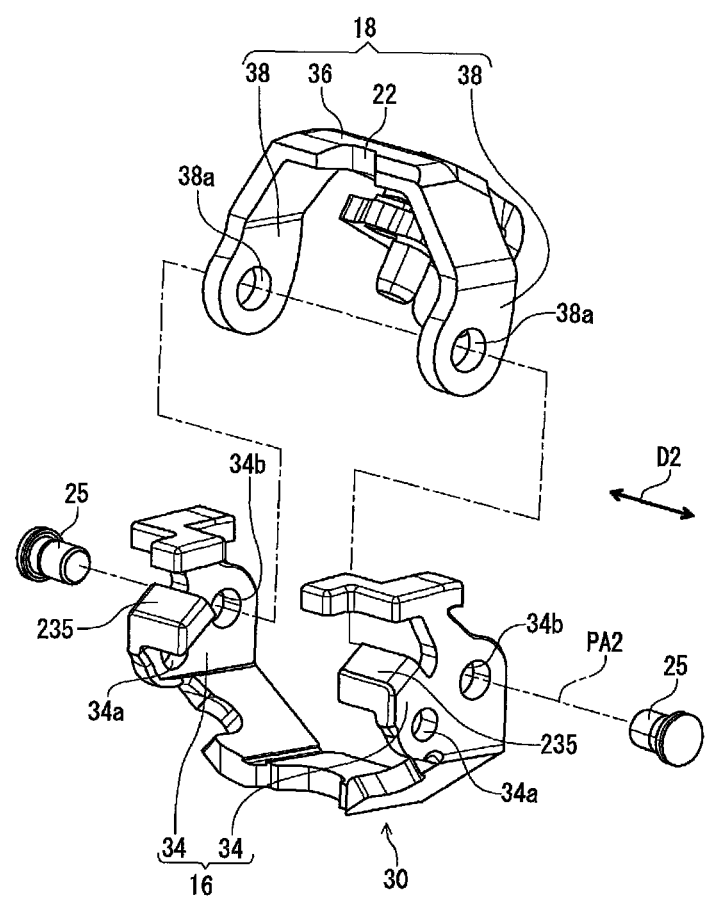
FIG. 14 is a partial exploded perspective view of the bicycle pedal illustrated in FIG. 12.

As seen in FIG. 14, the first sub member 16 includes a pair of engagement portions 235. The engagement portions 235 extends from the coupling portions 34, respectively. As seen in FIG. 13, the third end 248a is configured to engage with one of the engagement portions 235.

As seen in FIG. 13, the second biasing member 248 is configured to apply a biasing force FB23 to the first sub member 16 at a third point PT23 defined between the third end 248a and the first sub member 16. The second biasing member 248 is configured to apply a biasing force FB24 to the first clamping member 18 at a fourth point PT24 defined between the fourth end 248b and the first clamping member 18. A distance L21 between the first pivot axis PA1 and the third point PT23 is shorter than a distance L22 between the first pivot axis PA1 and the fourth point PT24. The distance L21 is shorter than a distance L23 between the first pivot axis PA1 and the second pivot axis PA2.

As described in the first embodiment, in the step-in operation of the bicycle pedal 210, the first sub member 16 and the first clamping member 18 pivot relative to the pedal body 14 about the first pivot axis PA1 in the first pivot direction D11. Thus, only the first biasing member 46 (FIG. 12) is compressed between the pedal body 14 and the first clamping member 18 in the step-in operation.

In the step-out operation of the bicycle pedal 210, the first clamping member 18 pivots relative to the first sub member 16 about the second pivot axis PA2 in the third pivot direction D13. Thus, the first biasing member 46 (FIG. 12) and the second biasing member 248 are compressed between the first sub member 16 and the first clamping member 18.

Namely, the first sub member 16, the first pivot axis PA1, the first clamping member 18, the second pivot axis PA2 and the biasing structure 244 are configured such that a first torque T21 to pivot the first sub member 16 about the first pivot axis PA1 toward the second position P2 is less than a second torque T22 to pivot the first clamping member 18 about the second pivot axis PA2 toward the fourth position P4. Accordingly, it is possible to make the step-in operation easier for the user while the cleat 2 is strongly held by the bicycle pedal 210 so that the cleat 2 is prevented from being unintentionally released from the bicycle pedal 210.

As seen in FIG. 13, since the distance L21 is shorter than the distance L22, a third rotational moment M23 caused by the biasing force FB23 about the first pivot axis PA1 is smaller than the second rotational moment M2. Thus, the third rotational moment M23 does not prevent the second rotational moment M2 from pivoting the first sub member 16 about the first pivot axis PA1 in the second pivot direction D12 in the step out operation.

With the bicycle pedal 210, as seen in FIG. 13, since the first pivot axis PA1 is closer to the point PT1 on the pedal axle 14 than the second pivot axis PA2 when viewed from the axial direction D2 parallel to the first pivot axis PA1, it is possible to obtain substantially the same advantageous effect as that of the bicycle pedal 10 in accordance with the first embodiment.

Third Embodiment

A bicycle pedal 310 in accordance with a third embodiment will be described below referring to FIGS. 15 to 22. The bicycle pedal 310 has the same configuration as the bicycle pedal 10 except for the biasing structure 44. Thus, elements having substantially the same function as those in the above embodiments will be numbered the same here, and will not be described and/or illustrated again in detail here for the sake of brevity.

Figure 15:
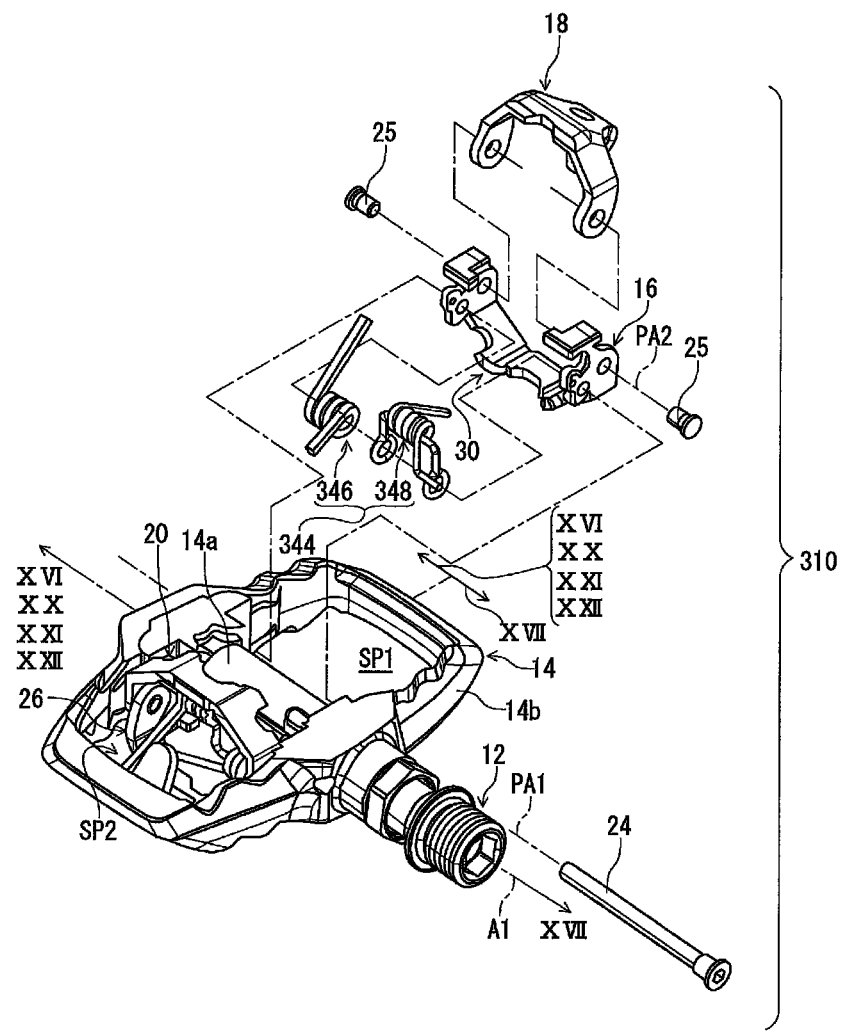
FIG. 15 is an exploded perspective view of a bicycle pedal in accordance with a third embodiment.

As seen in FIG. 15, the bicycle pedal 310 comprises a biasing structure 344. The biasing structure 344 includes a first biasing member 346 and a second biasing member 348.

Figure 16:
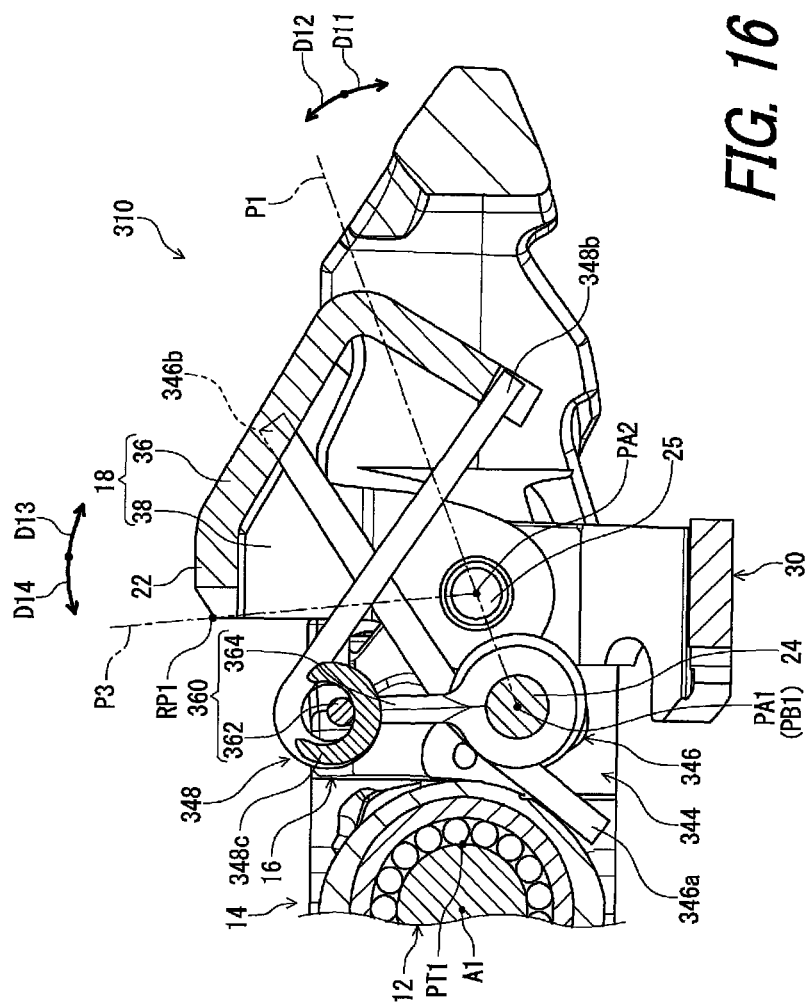
FIG. 16 is a partial enlarged cross-sectional view of the bicycle pedal taken along line XVI-XVI of FIG. 15.

As seen in FIG. 16, the biasing structure 344 is configured to bias the first clamping member 18 in the fourth pivot direction D14 and the first sub member 16 in the second pivot direction D12. The first biasing member 346 is configured to bias the first clamping member 18 relative to the pedal body 14 in the fourth pivot direction D14 as well as the first biasing member 46 in accordance with the first embodiment. The second biasing member 348 is configured to bias the first clamping member 18 relative to the first sub member 16 in the fourth pivot direction D14 as well as the second biasing member 246 in accordance with the second embodiment. The first biasing member 346 has substantially the same function as that of the first biasing member 46 in accordance with the first embodiment. The second biasing member 348 has substantially the same function as that of the second biasing member 248 in accordance with the second embodiment. However, the first biasing member 346 and the second biasing embodiment 348 have different constructions from the constructions of the first biasing member 46 and the second biasing member 248.

The first biasing member 346 includes a first end 346a and a second end 346b. The first end 346a is configured to engage with the pedal body 14. The second end 346b is configured to engage with the first clamping member 18. In the illustrated embodiment, the first end 346a is configured to engage with the tubular part 14a of the pedal body 14. The second end 346b is configured to engage with the clamping body 36 and/or one of the attachment portions 38 instead of the adjustment plate 44. In the illustrated embodiment, the adjustment plate 40 and the adjustment bolt 42 are omitted from the first clamping member 18.

Figure 17:
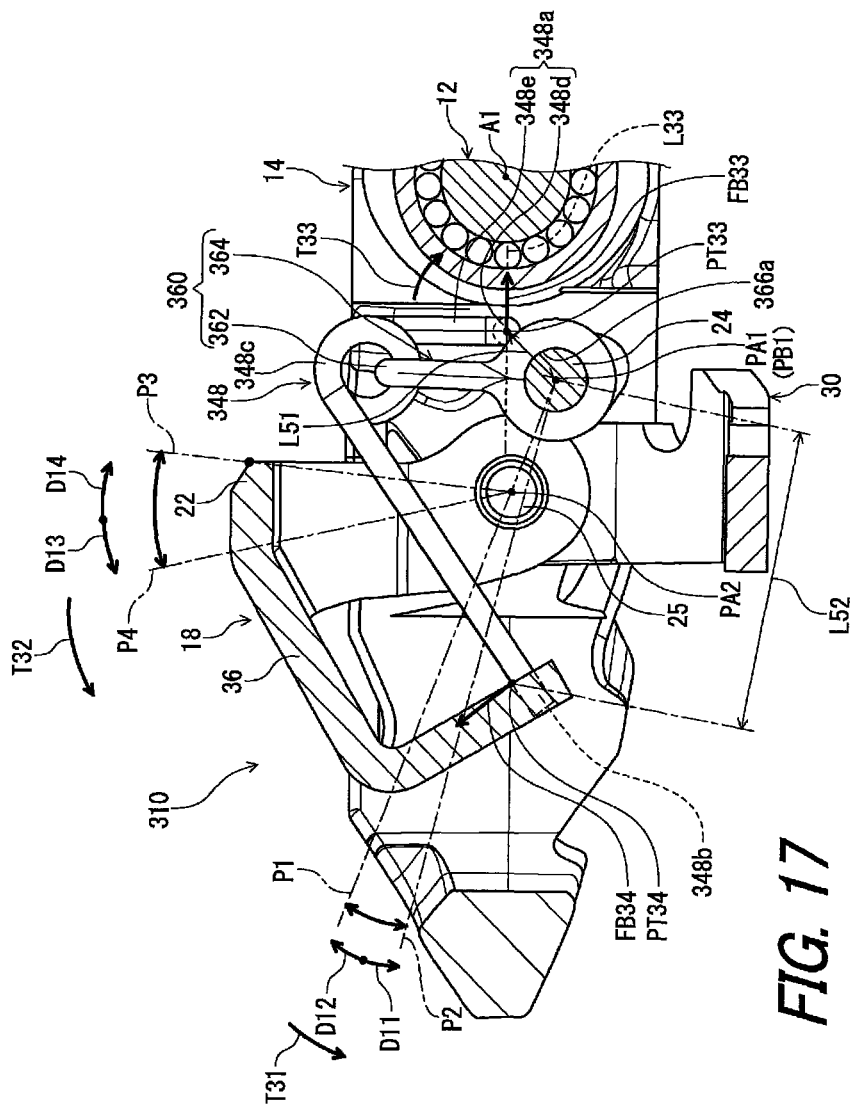
FIG. 17 is a partial enlarged cross-sectional view of the bicycle pedal taken along line XVII-XVII of FIG. 15.

As seen in FIGS. 16 and 17, the second biasing member 348 includes a third end 348a and a fourth end 348b. The third end 348a is configured to engage with the first sub member 16. The fourth end 348b is configured to engage with the first clamping member 18. In the illustrated embodiment, the fourth end 348b is configured to engage with the clamping body 36. The second biasing member 348 includes a coiled body 348c configured to generate a biasing force. The third end 348a and the fourth end 348b are connected with both ends of the coiled body 348c, respectively.

Figure 18:
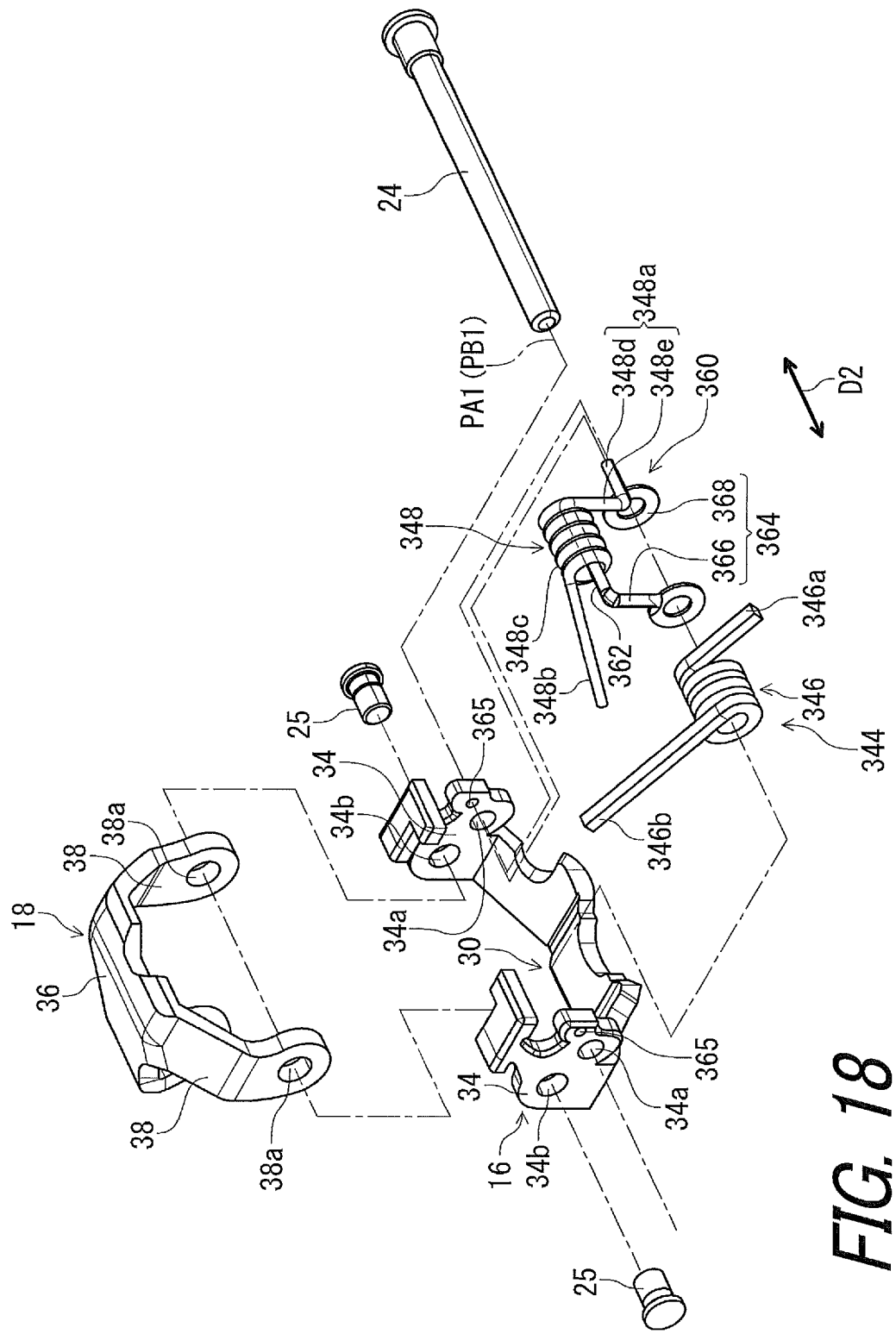
FIG. 18 is a partial exploded perspective view of the bicycle pedal illustrated in FIG. 15.
Figure 19:
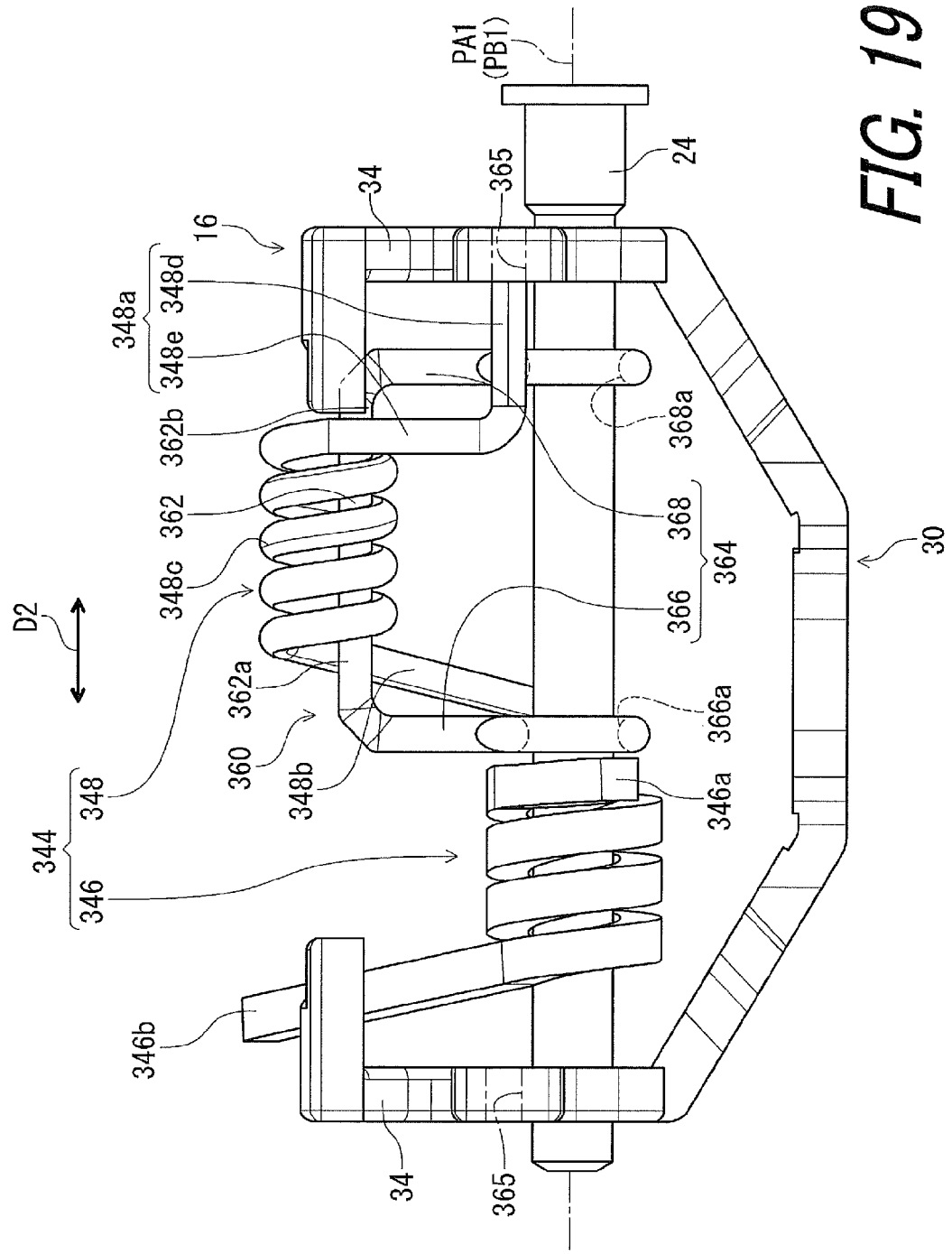
FIG. 19 is a partial side elevational view of a biasing structure of the bicycle pedal illustrated in FIG. 15.

As seen in FIGS. 18 and 19, each of the coupling portions 34 of the first sub member 16 includes a through-hole 365. The third end 348a is inserted in one of the through-holes 365. More specifically, the third end 348a of the second biasing member 348 includes a contact part 348d configured to contact the first sub member 16. The third end 348a includes an arm part 348e. The contact part 348d extends from the arm part 348e in the axial direction D2. The contact part 348d inserted in one of the through-hole 365 to transmit the biasing force from the second biasing member 348 to the first sub member 16.

As seen in FIG. 17, the biasing structure 344 includes a biasing support 360 configured to support the second biasing member 348 to be pivotable relative to the first sub member 16 about a biasing pivot axis PB1. The biasing pivot axis PB1 is substantially coaxial with the first pivot axis PA1. More specifically, the biasing pivot axis PB1 is coaxial with the first pivot axis PA1.

The biasing support 360 includes a movable part 362 and a pivot part 364. The movable part 362 is spaced apart from the biasing pivot axis PB1. The movable part 362 is spaced apart from the biasing pivot axis PB1, the first pivot axis PA1, and the second pivot axis PA2. The second biasing member 348 is mounted to the movable part 362.

As seen in FIGS. 18 and 19, the movable part 362 extends in a direction substantially parallel to the biasing pivot axis PB1. In the illustrated embodiment, the movable part 362 extends in the axial direction D2. The movable part 362 extends through the coiled body 348c.

The pivot part 364 is configured to pivotably support the movable part 362 relative to the pedal body 14 about the biasing pivot axis PB1. The pivot part 364 includes a first pivot part 366 and a second pivot part 368. The movable part 362 includes a first movable end 362a and a second movable end 362b. The first pivot part 366 is provided at the first movable end 362a. The second pivot part 368 is provided at the second movable end 362b. The first pivot part 366 extends from the first movable end 362a in the radial direction perpendicular to the biasing pivot axis PB1. The second pivot part 368 extends from the second movable end 362b in the radial direction perpendicular to the biasing pivot axis PB1.

As seen in FIGS. 18 and 19, each of the first pivot part 366 and the second pivot part 368 is pivotally mounted to the first pivot shaft 24. The first pivot part 366 includes a first hole 366a. The second pivot part end 368 includes a second hole 368a. The first pivot shaft 24 extends through the first hole 366a and the second hole 368a. The biasing support 360 is pivotable relative to the first sub member 16 and the first clamping member 18 (FIG. 18) about the first pivot axis PA1.

As seen in FIG. 17, the movable part 362 is provided between the pedal axle 12 and the second pivot axis PA2 when viewed from the axial direction D2 parallel to the rotational axis A1 (a direction perpendicular to a paper surface of FIG. 17). The movable part 362 is closer to the pedal axle 12 than the second pivot axis PA2 when viewed from the axial direction D2 parallel to the rotational axis A1. The movable part 362 is closer to the first cleat engagement portion 22 than the first pivot axis PA1 when viewed from the axial direction D2 parallel to the rotational axis A1. The contact part 348d is closer to the first cleat engagement portion 22 than the first pivot axis PA1 when viewed from the axial direction D2 parallel to the rotational axis A1.

Figure 20:
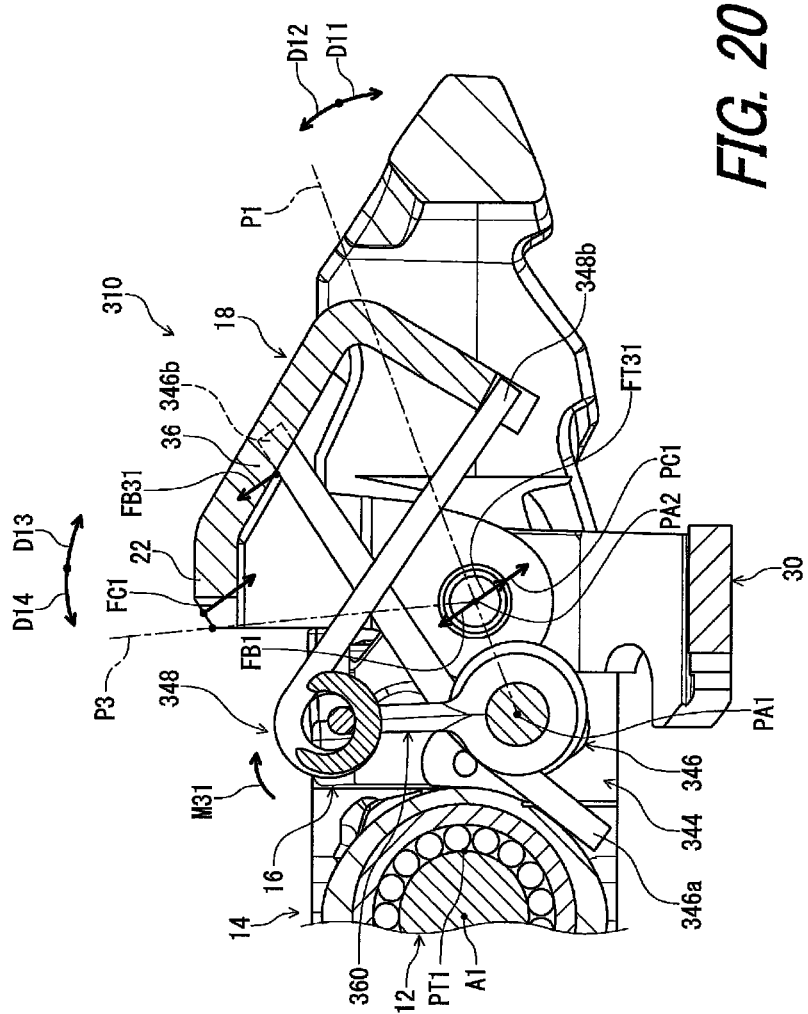
FIG. 20 is a partial enlarged cross-sectional view of the bicycle pedal taken along line XX-XX of FIG. 15.

As seen in FIG. 20, a first biasing force FB31 is applied to the first clamping member 18 (the clamping body 36) by the first biasing member 46. A first total force FT31 of the first biasing force FB31 and the first force FC1 is applied to the first clamping member 18 in the step-in operation of the bicycle pedal 10. It can be thought that the first total force FT31 is applied at the second pivot axis PA2. Since the first total force FT31 is offset from the first pivot axis PA1, a first rotational moment M31 (a first sub torque) is applied to the first sub member 16 about the first pivot axis PA1 in the first pivot direction D11. Thus, the first sub member 16 is moved relative to the pedal body 14 about the first pivot axis PA1 in the first pivot direction D11.

Namely, the first sub member 16, the first pivot axis PA1, the first clamping member 18, the second pivot axis PA2 and the biasing structure 344 are configured such that the first sub member 16 is moved relative to the pedal body 14 about the first pivot axis PA1 in the first pivot direction D11 in a state where the first force FC1 to move the first clamping member 18 in the first pivot direction D11 is applied to the first clamping member 18. More specifically, the first sub member 16 and the first clamping member 18 are pivoted relative to the pedal body 14 about the first pivot axis PA1 in the first pivot direction D11 in the step-in operation of the bicycle pedal 10.

Figure 21:
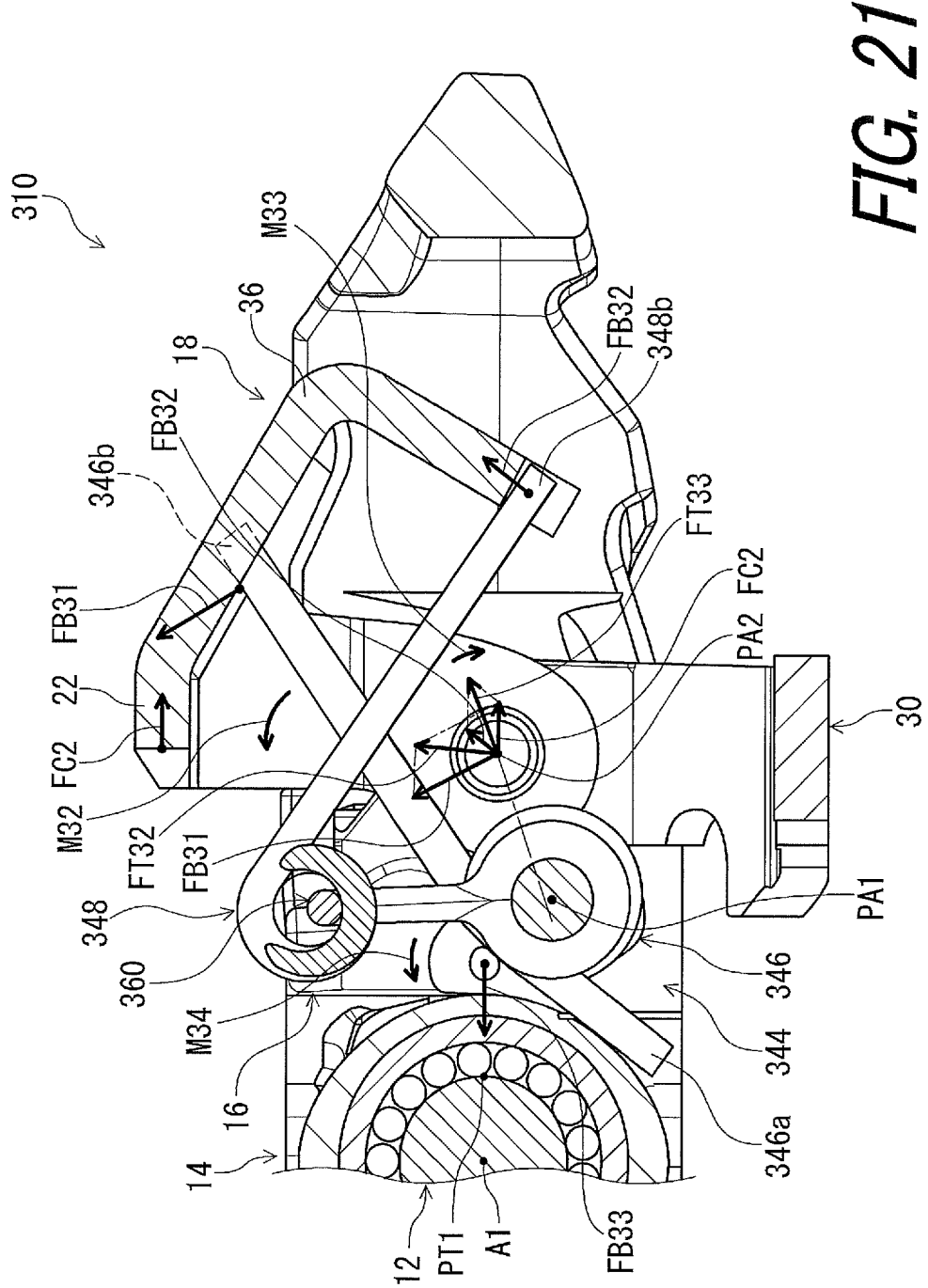
FIG. 21 is a partial enlarged cross-sectional view of the bicycle pedal taken along line XXI-XXI of FIG. 15.
Figure 22:
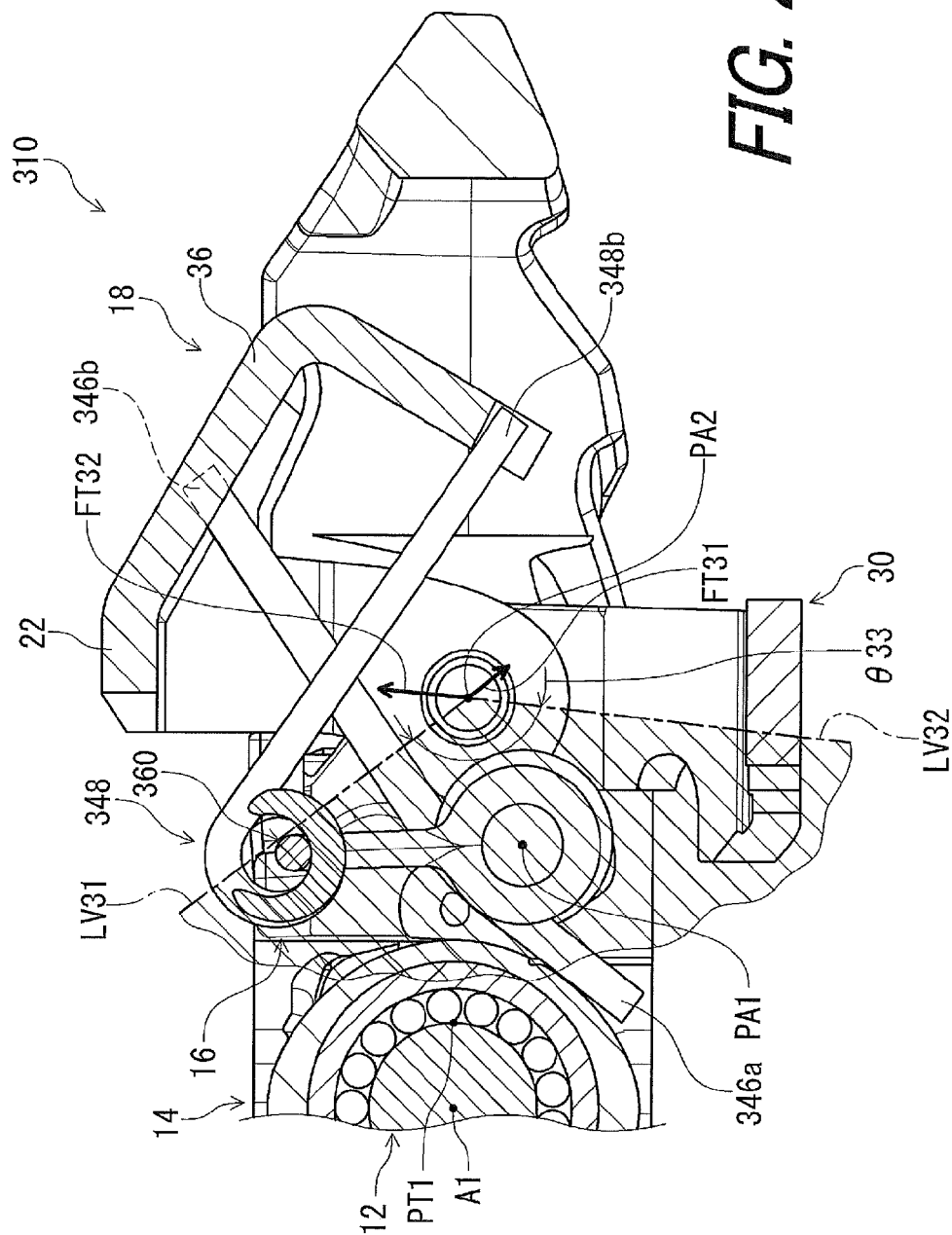
FIG. 22 is a partial enlarged cross-sectional view of the bicycle pedal taken along line XXII-XXII of FIG. 15.

On the other hand, as seen in FIG. 21, a second total force FT32 of the first biasing force FB31 and the second force FC2 is applied to the first clamping member 18 in the step-out operation of the bicycle pedal 10. It can be thought that the second total force FT32 is applied at the second pivot axis PA2. Further, a third total force FT33 of the second force FC2 and a biasing force FB34 made by the fourth end 348b is applied to the first clamping member 18 in the step out operation of the bicycle pedal 10. Furthermore, a biasing force FB33 made by the third end 348a is applied to the first sub member 16. Since the second total force FT32 is offset from the first pivot axis PA1, a second rotational moment M32 (a second sub torque) is applied to the first sub member 16 about the first pivot axis PA1 in the second pivot direction D12. Further, a third rotational moment M33 caused by the third total force FT33 is applied to the first sub member 16 about the first pivot axis PA1 in the first pivot direction D11. Furthermore, a fourth rotational moment M34 caused by the third biasing force FB33 is applied to the first sub member 16 about the first pivot axis PA1 in the second pivot direction D12. The total moment of the first, second and third rotational moments M32, M33 and M34 is applied to the first sub member 16 about the first pivot axis PA1 in the second pivot direction D12. Thus, the first sub member 16 stays at the first position P1 or is moved relative to the pedal body 14 about the first pivot axis PA1 in the second pivot direction D12.

Namely, the first sub member 16, the first pivot axis PA1, the first clamping member 18, the second pivot axis PA2 and the biasing structure 344 are configured such that the first sub member 16 stays or is moved relative to the pedal body 14 about the first pivot axis PA1 in the second pivot direction D12 in a state where the second force FC2 to move the first clamping member 18 in the third pivot direction D13 is applied to the first clamping member 18, as well as the first embodiment.

In a state where the restricting portion 21 (FIG. 3) restricts the first sub member 16 from pivoting in the second pivot direction D12 relative to the pedal body 14, the first sub member 16 stays at the first position P1 relative to the pedal body 14 in the step-out operation. At this time, the first clamping member 18 is pivoted about the second pivot axis PA2 relative to the first sub member 16 in the third pivot direction D13 due to the second force FC2.

In a state where the first sub member 16 is spaced apart from the restricting portion 21 (FIG. 3), the first sub member 16 is moved relative to the pedal body 14 about the first pivot axis PA1 in the second pivot direction D12 in the step-out operation. At this time, the first clamping member 18 is pivoted about the second pivot axis PA2 relative to the first sub member 16 in the third pivot direction D13 due to the second force FC2. After the first sub member 16 comes into contact with the restricting portion 21, the first sub member 16 stays at the first position P1 relative to the pedal body 14, and the first clamping member 18 is further pivoted about the second pivot axis PA2 relative to the first sub member 16 in the third pivot direction D13 due to the second force FC2.

As seen in FIG. 17, the second biasing member 348 is configured to apply a biasing force FB33 to the first sub member 16 at a third point PT33 defined between the third end 348a and the first sub member 16. The second biasing member 348 is configured to apply a biasing force FB34 to the first clamping member 18 at a fourth point PT34 defined between the fourth end 348b and the first clamping member 18. A distance L51 between the first pivot axis PA1 and the third point PT33 is shorter than a distance L52 between the first pivot axis PA1 and the fourth point PT34.

For example, the third point PT33 is defined on a center axis of the contact part 348d of the third end 348a. The third point PT33 is closer to the first cleat engagement portion 22 than the first pivot axis PA1 when viewed from the axial direction D2 parallel to the rotational axis A1. Thus, the biasing force FB33 provides the moment M34 about the first pivot axis PA1 to the first sub member 16 in the second pivot direction D12 in the step-out operation.

In the illustrated embodiment, the biasing force FB33 can be defined on a line L33 perpendicular to the third end 348a extends when viewed from the axial direction D2 parallel to the rotational axis A1. The line L33 is offset from the first pivot axis PA1 and is disposed between the first cleat engagement portion 22 and the first pivot axis PA1. Thus, the biasing force FB33 causes the first sub member 16 to pivot relative to the pedal body 14 about the first pivot axis PA1 in the second pivot direction D12.

In the step-in operation of the bicycle pedal 310, the first sub member 16 and the first clamping member 18 pivot relative to the pedal body 14 about the first pivot axis PA1 in the first pivot direction D11. Thus, only the first biasing member 346 (FIG. 16) is compressed between the pedal body 14 and the first clamping member 18 in the step-in operation.

In the step-out operation of the bicycle pedal 310, the first clamping member 18 pivots relative to the first sub member 16 about the second pivot axis PA2 in the third pivot direction D13. Thus, the first biasing member 346 (FIG. 16) and the second biasing member 248 are compressed between the first sub member 16 and the first clamping member 18.

Namely, the first sub member 16, the first pivot axis PA1, the first clamping member 18, the second pivot axis PA2 and the biasing structure 44 are configured such that a first torque T31 to pivot the first sub member 16 about the first pivot axis PA1 toward the second position P2 is less than a second torque T32 to pivot the first clamping member 18 about the second pivot axis PA2 toward the fourth position P4. Accordingly, it is possible to make the step-in operation easier for the user while the cleat 2 is strongly held by the bicycle pedal 310 so that the cleat 2 is prevented from being unintentionally released from the bicycle pedal 310.

With the bicycle pedal 310, as seen in FIG. 16, the first pivot axis PA1 is closer to the point PT1 on the pedal axle 14 than the second pivot axis PA2 when viewed from the axial direction D2 parallel to the first pivot axis PA1. This arrangement enables switching the pivot axis of the first clamping member 18 between the first pivot axis PA1 and the second pivot axis PA2 in the step-in operation and the step-out operation. Thus, the first torque T31 to pivot the first sub member 16 about the first pivot axis PA1 in the first pivot direction D11 in the step-in operation is less than the second torque T32 to pivot the first clamping member 18 about the second pivot axis PA2 in the third pivot direction D13 in the step-out operation. Accordingly, it is possible to make the step-in operation easier for the user while the cleat 2 is strongly held by the bicycle pedal 310 so that the cleat 2 is prevented from being unintentionally released from the bicycle pedal 310.

Fourth Embodiment

A bicycle pedal 410 in accordance with a fourth embodiment will be described below referring to FIGS. 23 to 27. The bicycle pedal 410 has the same configuration as the bicycle pedal 310 except for the biasing structure 344. Thus, elements having substantially the same function as those in the above embodiments will be numbered the same here, and will not be described and/or illustrated again in detail here for the sake of brevity.

Figure 23:
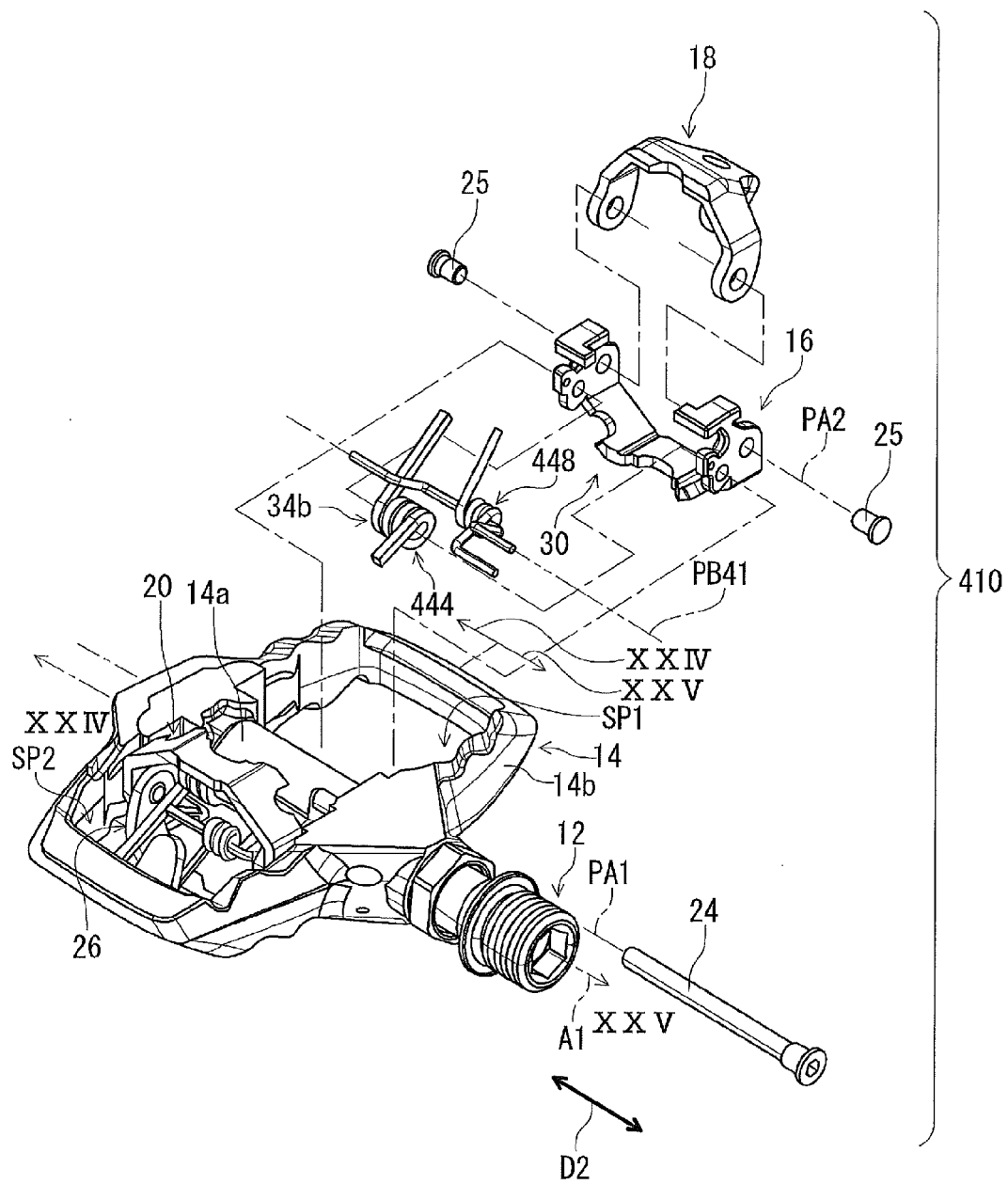
FIG. 23 is an exploded perspective view of a bicycle pedal in accordance with a fourth embodiment.

As seen in FIG. 23, the bicycle pedal 410 comprises a biasing structure 444. The biasing structure 444 includes the first biasing member 346 and a second biasing member 448.

Figure 24:
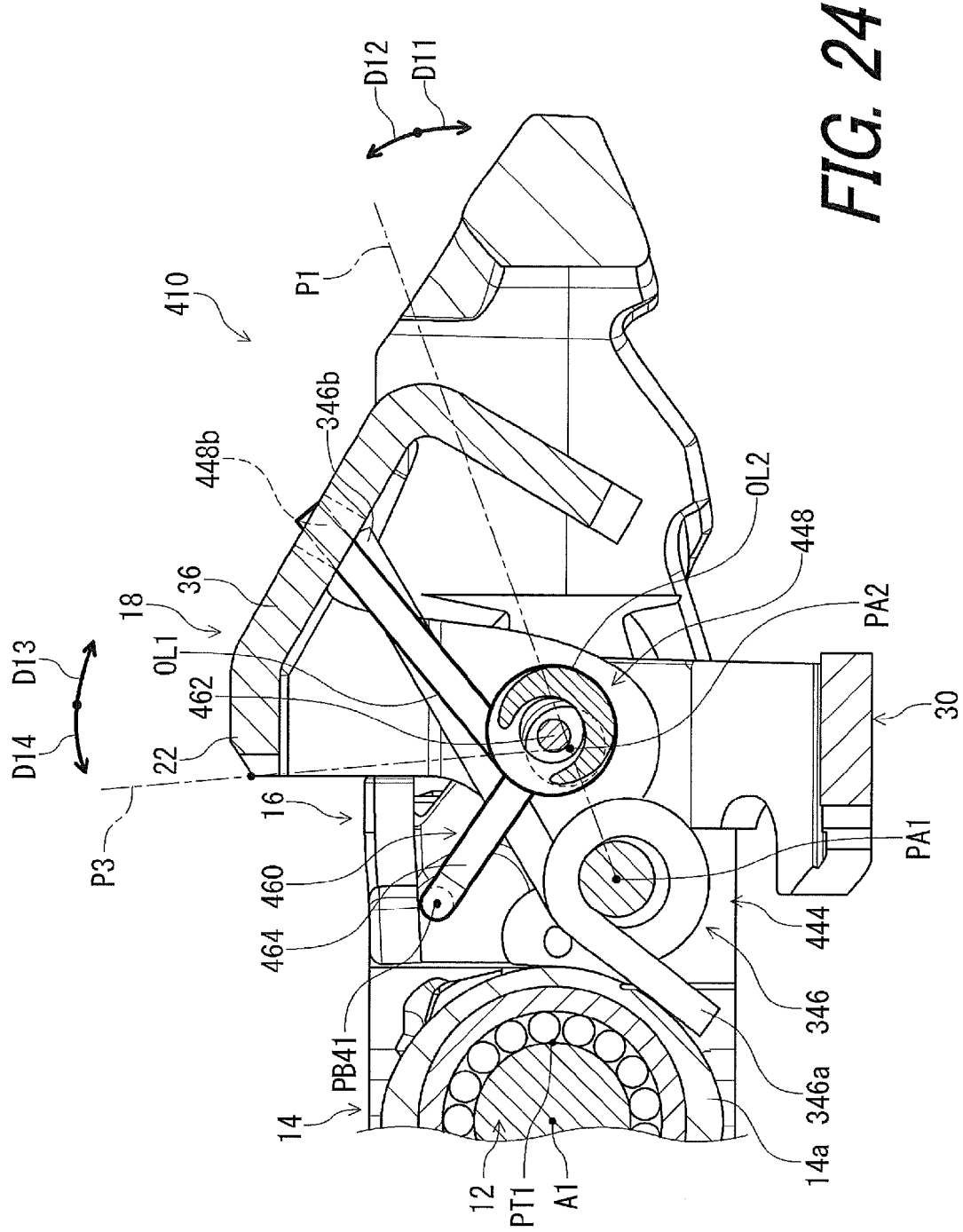
FIG. 24 is a partial enlarged cross-sectional view of the bicycle pedal taken along line XXIV-XXIV of FIG. 23.

As seen in FIG. 24, the biasing structure 444 is configured to bias the first clamping member 18 in the fourth pivot direction D14 and the first sub member 16 in the second pivot direction D12. The second biasing member 448 is configured to bias the first clamping member 18 relative to the first sub member 16 in the fourth pivot direction D14 as well as the second biasing member 348 in accordance with the third embodiment. The second biasing member 448 has substantially the same function as that of the second biasing member 348 in accordance with the third embodiment. However, the second biasing embodiment 448 have different constructions from the construction of the second biasing member 348.

Figure 25:
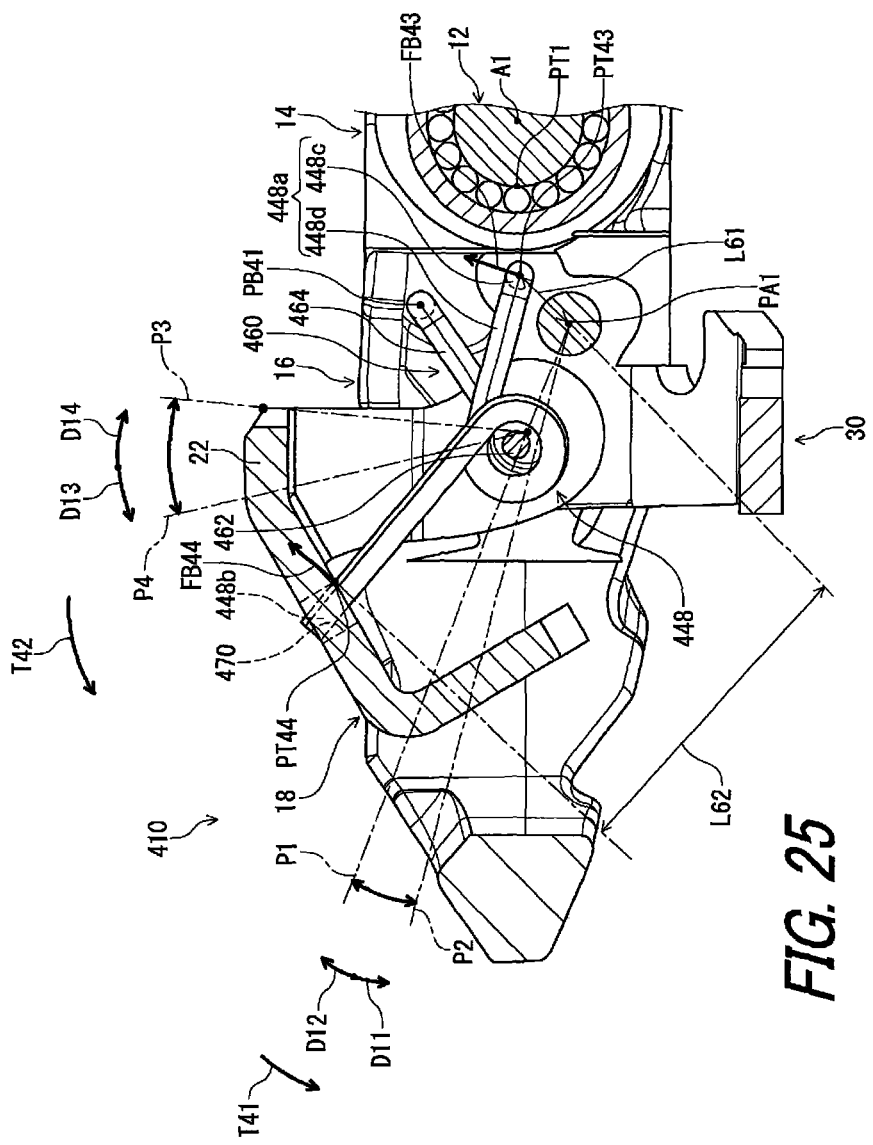
FIG. 25 is a partial enlarged cross-sectional view of the bicycle pedal taken along line XXV-XXV of FIG. 23.

As seen in FIGS. 24 and 25, the second biasing member 448 includes a third end 448a and a fourth end 448b. The third end 448a is configured to engage with the first sub member 16. The fourth end 448b is configured to engage with the first clamping member 18. In the illustrated embodiment, the fourth end 348b is configured to engage with the clamping body 36. The clamping body 36 of the first clamping member 18 includes an attachment hole 470. The fourth end 448b is inserted in the attachment hole 470. The second biasing member 448 includes a coiled body 448c configured to generate a biasing force. The third end 448a and the fourth end 448b are connected with both ends of the coiled body 448c, respectively.

Figure 26:
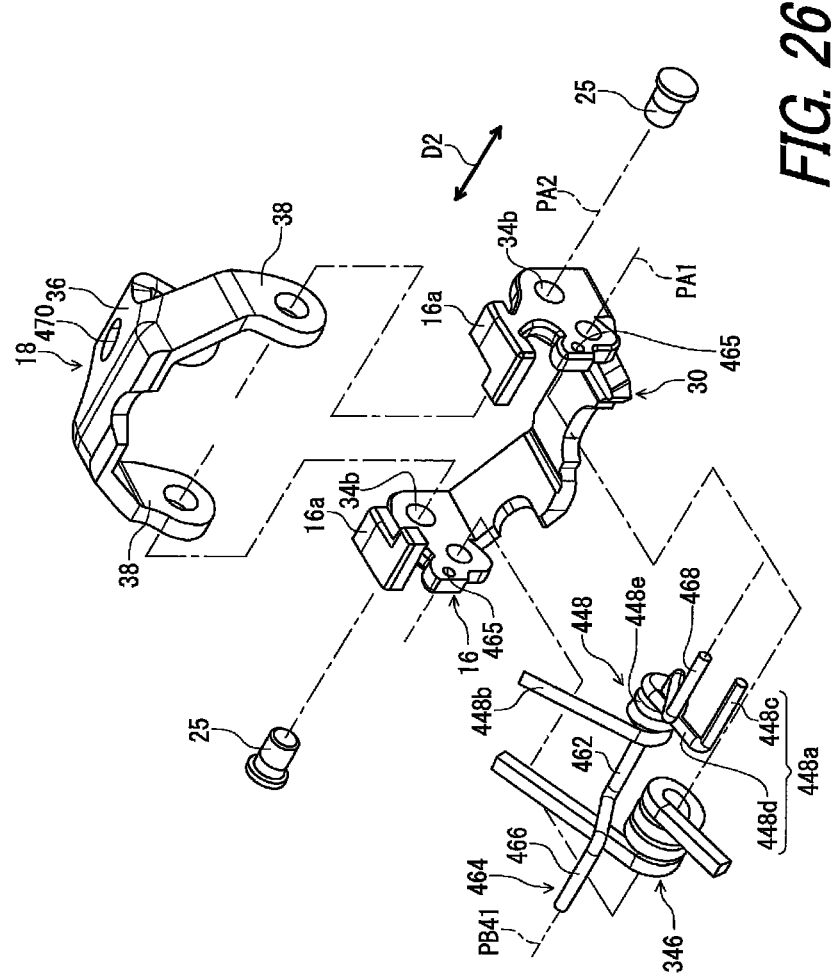
FIG. 26 is a partial exploded perspective view of the bicycle pedal illustrated in FIG. 23.
Figure 27:
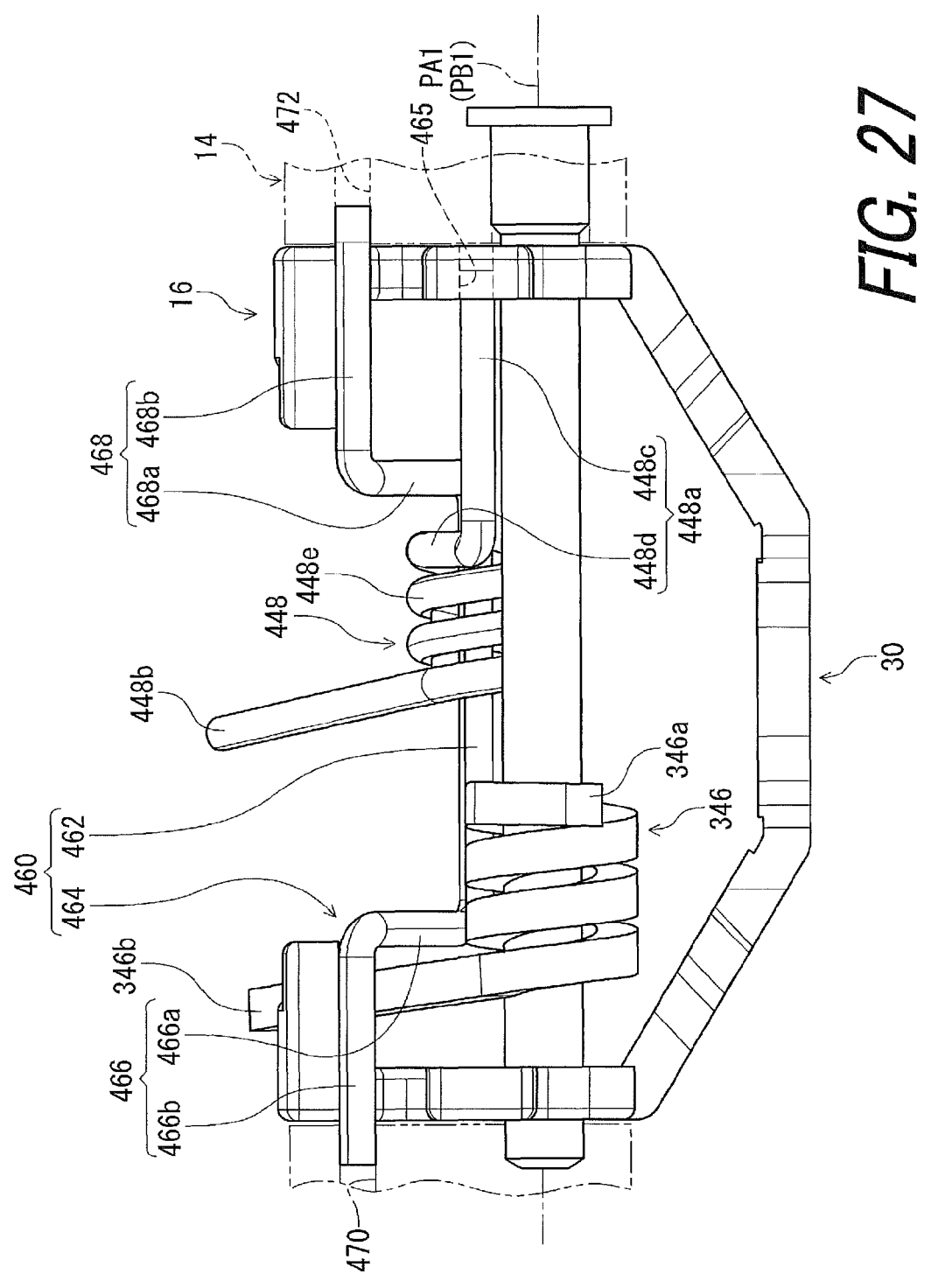

As seen in FIGS. 26 and 27, each of the coupling portions 34 of the first sub member 16 includes a through-hole 465. The third end 448a is inserted in one of the through-holes 465. More specifically, the third end 448a of the second biasing member 448 includes a contact part 448d configured to contact the first sub member 16. The third end 448a includes an arm part 448e. The contact part 448d extends from the arm part 448e in a direction parallel to the first pivot axis PA1. The contact part 448d is inserted in one of the through-hole 465 to transmit the biasing force from the second biasing member 448 to the first sub member 16.

As seen in FIG. 25, the biasing structure 444 includes a biasing support 460 configured to support the second biasing member 448 to be pivotable relative to the first sub member 16 about a biasing pivot axis PB41. Unlike the biasing support 360 in accordance with the third embodiment, the biasing pivot axis PB41 is not coaxial with the first pivot axis PA1. The biasing pivot axis PB41 is spaced apart from the first pivot axis PB1 and the second pivot axis PB2 when viewed from the axial direction D2 parallel to the rotational axis A1.

The biasing support 460 includes a movable part 462 and a pivot part 464. The movable part 462 is spaced apart from the biasing pivot axis PB41. The movable part 462 is spaced apart from the biasing pivot axis PB1 and the first pivot axis PA1. The second biasing member 448 is mounted to the movable part 462.

As seen in FIGS. 26 and 27, the movable part 462 extends in a direction substantially parallel to the biasing pivot axis PB41. In the illustrated embodiment, the movable part 462 extends in the axial direction D2. The movable part 462 extends through the coiled body 448c.

The pivot part 464 is configured to pivotably support the movable part 462 relative to the pedal body 14 about the biasing pivot axis PB41. The pivot part 464 is configured to be pivotably connected to the pedal body 14. The pivot part 464 includes a first pivot part 466 and a second pivot part 468. The movable part 462 includes a first movable end 462a and a second movable end 462b. The first pivot part 466 is provided at the first movable end 462a. The second pivot part 468 is provided at the second movable end 462b.

The first pivot part 466 includes a first connecting part 466a and a first shaft 466b. The first connecting part 466a extends from the first movable end 462a in the radial direction perpendicular to the biasing pivot axis PB41. The first shaft 466b extends from an end of the first connecting part 466a along the biasing pivot axis PB41.

The second pivot part 468 includes a second connecting part 468a and a second shaft 468b. The second connecting part 468a extends from the second movable end 462b in the radial direction perpendicular to the biasing pivot axis PB41. The second shaft 468b extends from an end of the second connecting part 468a along the biasing pivot axis PB41. The second shaft 468b is coaxial with the first shaft 466b.

As seen in FIG. 27, each of the first pivot part 466 and the second pivot part 468 is pivotally mounted to the pedal body 14. The pedal body 14 includes a first support hole 470 and a second support hole 472. The first shaft 466b is inserted in the first support hole 470. The second shaft 468b is inserted in the second support hole 472. The first pivot part 466 and the second pivot part 468 define the biasing pivot axis PB41. The biasing support 360 is pivotable relative to the first sub member 16 and the first clamping member 18 about the biasing pivot axis PB41.

As seen in FIG. 24, the biasing pivot axis PB41 is closer to the first cleat engagement portion 22 than the second pivot axis PA2 when viewed from the axial direction D2 parallel to the rotational axis A1 (a direction perpendicular to a paper surface of FIG. 24). The biasing pivot axis PB41 is closer to the first cleat engagement portion 22 than the first pivot axis PA1 when viewed from the axial direction D2 parallel to the rotational axis A1. The biasing pivot axis PB41 is closer to the pedal axle 12 than the second pivot axis PA2 when viewed from the axial direction D2 parallel to the rotational axis A1.

When viewed from the axial direction D2 parallel to the rotational axis A1, the second pivot axis PA2 is disposed within an outline OL1 of the second biasing member 448 in a state where the first clamping member 18 is disposed at a rest position where the first clamping member 18 is free from a force from the cleat 2. When viewed from the axial direction D2 parallel to the rotational axis A1, the second pivot axis PA2 is disposed within the outline OL2 of the coiled body 448c of second biasing member 448 in the state where the first clamping member 18 is disposed at the rest position where the first clamping member 18 is free from a force from the cleat 2. In the illustrated embodiment, the rest position of the first clamping member 18 is the third position P3 and the fifth position P5. The contact part 448d is closer to the first cleat engagement portion 22 than the first pivot axis PA1 when viewed from the axial direction D2 parallel to the rotational axis A1.

As seen in FIG. 25, the second biasing member 448 is configured to apply a biasing force FB43 to the first sub member 16 at a third point PT43 defined between the third end 448a and the first sub member 16. The second biasing member 448 is configured to apply a biasing force FB44 to the first clamping member 18 at a fourth point PT44 defined between the fourth end 448b and the first clamping member 18. A distance L61 between the first pivot axis PA1 and the third point PT43 is shorter than a distance L62 between the first pivot axis PA1 and the fourth point PT44.

In the step-in operation of the bicycle pedal 410, the first sub member 16 and the first clamping member 18 pivot relative to the pedal body 14 about the first pivot axis PA1 in the first pivot direction D11. Thus, only the first biasing member 346 (FIG. 16) is compressed between the pedal body 14 and the first clamping member 18 in the step-in operation.

In the step-out operation of the bicycle pedal 410, the first clamping member 18 pivots relative to the first sub member 16 about the second pivot axis PA2 in the third pivot direction D13. Thus, the first biasing member 346 (FIG. 24) and the second biasing member 448 are compressed between the first sub member 16 and the first clamping member 18.

Namely, the first sub member 16, the first pivot axis PA1, the first clamping member 18, the second pivot axis PA2 and the biasing structure 444 are configured such that a first torque T41 to pivot the first sub member 16 about the first pivot axis PA1 toward the second position P2 is less than a second torque T42 to pivot the first clamping member 18 about the second pivot axis PA2 toward the fourth position P4. Accordingly, it is possible to make the step-in operation easier for the user while the cleat 2 is strongly held by the bicycle pedal 410 so that the cleat 2 is prevented from being unintentionally released from the bicycle pedal 410.

With the bicycle pedal 410, as seen in FIG. 24, since the first pivot axis PA1 is closer to the point PT1 on the pedal axle 14 than the second pivot axis PA2 when viewed from the axial direction D2 parallel to the first pivot axis PA1, it is possible to obtain substantially the same advantageous effect as that of the bicycle pedal 310 in accordance with the third embodiment.

It will be apparent to those skilled in the bicycle field from the present disclosure that feathers of the first to fourth embodiments can be combined with each other if needed and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle pedal comprising:
   a pedal axle;
   a pedal body rotatably supported on the pedal axle about a rotational axis;
   a first sub member movably coupled to the pedal body, the first sub member being movable relative to the pedal body about a first pivot axis in a first pivot direction and a second pivot direction opposite to the first pivot direction;
   a first clamping member movably coupled to the first sub member, the first clamping member being movable relative to the first sub member about a second pivot axis substantially parallel to the first pivot axis in a third pivot direction and a fourth pivot direction opposite to the third pivot direction;
   a second clamping member coupled to the pedal body to clamp a cleat together with the first clamping member;
   a first pivot shaft defining the first pivot axis;
   a second pivot shaft defining the second pivot axis, the second pivot shaft being attached to the first sub member to pivotably support the first clamping member about the second pivot axis; and
   a biasing structure configured to bias the first clamping member in the fourth pivot direction and the first sub member in the second pivot direction, the first pivot axis being closer to a point on the pedal axle than the second pivot axis when viewed from an axial direction parallel to the first pivot axis.

2. The bicycle pedal according to claim 1, wherein the first pivot axis is substantially parallel to the rotational axis, and
   the first pivot axis is closer to the pedal axle than the second pivot axis when viewed from the axial direction parallel to the first pivot axis.

3. The bicycle pedal according to claim 1, wherein the first clamping member includes a first cleat engagement portion configured to engage the cleat in a state where the first clamping member and the second clamping member clamp the cleat, and
   the second pivot axis is closer to the first cleat engagement portion than the first pivot axis when viewed from the axial direction parallel to the rotational axis.

4. The bicycle pedal according to claim 1, wherein the first sub member is coupled to the pedal body via the first pivot shaft to be movable relative to the pedal body about the first pivot axis between a first position and a second position,
   the first clamping member is coupled to the first sub member via the second pivot shaft to be movable relative to the first sub member about the second pivot axis between a third position and a fourth position, and
   the first pivot shaft is closer to the point on the pedal axle than the second pivot shaft when viewed from the axial direction such that a first torque to pivot the first sub member about the first pivot axis toward the second position against a biasing force of the biasing structure is less than a second torque to pivot the first clamping member about the second pivot axis toward the fourth position against the biasing force of the biasing structure.

5. The bicycle pedal according to claim 1, wherein the first sub member, the first pivot axis, the first clamping member, the second pivot axis and the biasing structure are configured such that the first sub member is moved relative to the pedal body about the first pivot axis in the first pivot direction in a state where a first force to move the first clamping member in the first direction is applied to the first clamping member, and
   the first sub member, the first pivot axis, the first clamping member, the second pivot axis and the biasing structure are configured such that the first sub member stays or is moved relative to the pedal body about the first pivot axis in the second pivot direction in a state where a second force to move the first clamping member in the third direction is applied to the first clamping member, the first force directing in a direction different from a direction of the second force.

6. The bicycle pedal according to claim 5, wherein the first force is applied from the cleat to the first clamping member in a step-in operation of the bicycle pedal, and
   the second force is applied from the cleat to the first clamping member in a step-out operation of the bicycle pedal.

7. The bicycle pedal according to claim 6, wherein the first force directs in a first force direction to provide a first force angle between the first force direction and a cleat attachment plane defined by the first clamping member and the second clamping member,
   the second force directs in a second force direction to provide a second force angle between the second force direction and the cleat attachment plane, and
   the first force angle is larger than the second force angle.

8. The bicycle pedal according to claim 3, wherein
the biasing structure includes
- a first biasing member configured to bias the first clamping member relative to the pedal body in the fourth pivot direction, and
- a second biasing member configured to bias the first clamping member relative to the first sub member in the fourth pivot direction.

9. A bicycle pedal comprising:
- a pedal axle;
- a pedal body rotatably supported on the pedal axle about a rotational axis;
- a first sub member movably coupled to the pedal body, the first sub member being movable relative to the pedal body about a first pivot axis in a first pivot direction and a second pivot direction opposite to the first pivot direction;
- a first clamping member movably coupled to the first sub member, the first clamping member being movable relative to the first sub member about a second pivot axis substantially parallel to the first pivot axis in a third pivot direction and a fourth pivot direction opposite to the third pivot direction;
- a second clamping member coupled to the pedal body to clamp a cleat together with the first clamping member; and
- a biasing structure configured to bias the first clamping member in the fourth pivot direction and the first sub member in the second pivot direction, the first pivot axis being closer to a point on the pedal axle than the second pivot axis when viewed from an axial direction parallel to the first pivot axis,
- the first clamping member including a first cleat engagement portion configured to engage the cleat in a state where the first clamping member and the second clamping member clamp the cleat,
- the second pivot axis being closer to the first cleat engagement portion than the first pivot axis when viewed from the axial direction parallel to the rotational axis,
- the biasing structure including
  - a first biasing member configured to bias the first clamping member relative to the pedal body in the fourth pivot direction, and
  - a second biasing member configured to bias the first clamping member relative to the first sub member in the fourth pivot direction,
- the first biasing member including
  - a first end configured to engage with the pedal body, and
  - a second end configured to engage with the first clamping member, and
- the second biasing member including
  - a third end configured to engage with the first sub member, and
  - a fourth end configured to engage with the first clamping member.

10. The bicycle pedal according to claim 9, wherein
the second biasing member is configured to apply a biasing force to the first sub member at a third point defined between the third end and the first sub member,
the second biasing member is configured to apply a biasing force to the first clamping member at a fourth point defined between the fourth end and the first clamping member, and
a distance between the first pivot axis and the third point is shorter than a distance between the first pivot axis and the fourth point.

11. A bicycle pedal comprising:
- a pedal axle;
- a pedal body rotatably supported on the pedal axle about a rotational axis;
- a first sub member movably coupled to the pedal body, the first sub member being movable relative to the pedal body about a first pivot axis in a first pivot direction and a second pivot direction opposite to the first pivot direction;
- a first clamping member movably coupled to the first sub member, the first clamping member being movable relative to the first sub member about a second pivot axis substantially parallel to the first pivot axis in a third pivot direction and a fourth pivot direction opposite to the third pivot direction;
- a second clamping member coupled to the pedal body to clamp a cleat together with the first clamping member; and
- a biasing structure configured to bias the first clamping member in the fourth pivot direction and the first sub member in the second pivot direction, the first pivot axis being closer to a point on the pedal axle than the second pivot axis when viewed from an axial direction parallel to the first pivot axis,
- the first clamping member including a first cleat engagement portion configured to engage the cleat in a state where the first clamping member and the second clamping member clamp the cleat,
- the second pivot axis being closer to the first cleat engagement portion than the first pivot axis when viewed from the axial direction parallel to the rotational axis,
- the biasing structure including
  - a first biasing member configured to bias the first clamping member relative to the pedal body in the fourth pivot direction, and
  - a second biasing member configured to bias the first clamping member relative to the first sub member in the fourth pivot direction,
- the biasing structure including a biasing support configured to support the second biasing member to be pivotable relative to the first sub member about a biasing pivot axis.

12. The bicycle pedal according to claim 11, wherein
the biasing pivot axis is substantially coaxial with the first pivot axis.

13. The bicycle pedal according to claim 11, wherein
the biasing support includes
- a movable part spaced apart from the biasing pivot axis, and
- a pivot part configured to pivotably support the movable part relative to the pedal body about the biasing pivot axis, and
the second biasing member is mounted to the movable part.

14. The bicycle pedal according to claim 13, wherein
the movable part is provided between the pedal axle and the second pivot axis when viewed from the axial direction parallel to the rotational axis.

15. The bicycle pedal according to claim 13, wherein
the movable part is closer to the first cleat engagement portion than the first pivot axis when viewed from the axial direction parallel to the rotational axis.

16. The bicycle pedal according to claim 13, wherein
the third end of the second biasing member includes a contact part configured to contact the first sub member, and
the contact part is closer to the first cleat engagement portion than the first pivot axis when viewed from the axial direction parallel to the rotational axis.

17. The bicycle pedal according to claim 13, wherein
the pivot part is configured to be pivotably connected to the pedal body.

18. The bicycle pedal according to claim 13, wherein
the biasing pivot axis is closer to the first cleat engagement portion than the second pivot axis when viewed from the axial direction parallel to the rotational axis.

19. The bicycle pedal according to claim 13, wherein
when viewed from the axial direction parallel to the rotational axis, the second pivot axis is disposed within an outline of the second biasing member in a state where the first clamping member is disposed at a rest position where the first clamping member is free from a force from the cleat.

20. The bicycle pedal according to claim 18, wherein
the third end of the second biasing member includes a contact part configured to contact the first sub member, and
the contact part is closer to the first cleat engagement portion than the first pivot axis when viewed from the axial direction parallel to the rotational axis.

21. The bicycle pedal according to claim 1, wherein
the pedal body includes a restricting portion configured to restrict the first sub member from moving relative to the pedal body in the second pivot direction.

22. A bicycle pedal comprising:
a pedal axle;
a pedal body rotatably supported on the pedal axle about a rotational axis;
a first sub member movably coupled to the pedal body, the first sub member being movable relative to the pedal body about a first pivot axis in a first pivot direction and a second pivot direction opposite to the first pivot direction;
a first clamping member movably coupled to the first sub member, the first clamping member being movable relative to the first sub member about a second pivot axis substantially parallel to the first pivot axis in the third pivot direction and the fourth pivot direction;
a second clamping member coupled to the pedal body to clamp a cleat together with the first clamping member;
a first pivot shaft defining the first pivot axis;
a second pivot shaft defining the second pivot axis, the second pivot shaft being attached to the first sub member to pivotably support the first clamping member about the second pivot axis; and
a biasing structure configured to bias the first clamping member in the fourth pivot direction and the first sub member in the second pivot direction,
the first sub member, the first pivot axis, the first clamping member, the second pivot axis and the biasing structure being configured such that the first sub member is moved relative to the pedal body about the first pivot axis in the first pivot direction in a state where a first force to move the first clamping member in the first pivot direction is applied to the first clamping member, and
the first sub member, the first pivot axis, the first clamping member, the second pivot axis and the biasing structure being configured such that the first sub member stays or is moved relative to the pedal body about the first pivot axis in the second pivot direction in a state where a second force to move the first clamping member in the third pivot direction is applied to the first clamping member, the first force directing in a direction different from a direction of the second force.

* * * * *